United States Patent
Macias-Garza et al.

(10) Patent No.: US 6,247,144 B1
(45) Date of Patent: Jun. 12, 2001

(54) METHOD AND APPARATUS FOR COMPARING REAL TIME OPERATION OF OBJECT CODE COMPATIBLE PROCESSORS

(75) Inventors: Fernando Macias-Garza, Puebla (MX); Todd W. Miller, Tomball; Montgomery C. McGraw, Spring, both of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/355,104

(22) Filed: Dec. 13, 1994

Related U.S. Application Data

(63) Continuation of application No. 08/159,048, filed on Nov. 29, 1993, which is a continuation of application No. 07/649,851, filed on Jan. 31, 1991.

(51) Int. Cl.⁷ ...................................................... H02H 3/05
(52) U.S. Cl. .............................................................. 714/25
(58) Field of Search .................................. 371/68.3, 16.1, 371/9.1, 11.3, 68.1, 67.1; 395/575, 183.01, 183.03, 184.01, 182.08, 182.09, 182.07; 364/265, 228.3, 259.2, 268.3, 268.4, 268.1, 230.3

(56) References Cited

U.S. PATENT DOCUMENTS

| | | | |
|---|---|---|---|
| 3,783,250 | | 1/1974 | Fletcher et al. ...................... 235/153 |
| 4,099,241 | * | 7/1978 | Ossfeldt ................................ 364/200 |
| 4,196,470 | * | 4/1980 | Berg ...................................... 364/200 |
| 4,523,272 | * | 6/1985 | Fukunaga et al. ................... 395/287 |
| 4,590,549 | * | 5/1986 | Burrage et al. ..................... 371/68.3 |
| 4,635,186 | * | 1/1987 | Oman et al. ........................ 371/68.3 |
| 4,785,453 | * | 11/1988 | Chandran et al. .................. 371/68.3 |
| 4,816,990 | * | 3/1989 | Williams ............................... 395/650 |
| 4,849,979 | * | 7/1989 | Maccianti et al. .................. 371/68.3 |
| 4,916,695 | * | 4/1990 | Ossfeldt ................................ 371/9.1 |
| 4,947,368 | * | 8/1990 | Donaldson et al. ................. 364/900 |
| 4,965,717 | * | 10/1990 | Cutts, Jr. et al. .................... 364/200 |
| 5,016,249 | * | 5/1991 | Hurst et al. ......................... 371/68.3 |
| 5,054,026 | * | 10/1991 | Tsubota ............................... 371/68.3 |
| 5,136,595 | * | 8/1992 | Kimura ............................... 371/68.3 |
| 5,140,680 | * | 8/1992 | Best ..................................... 395/325 |
| 5,202,980 | * | 4/1993 | Morita et al. ........................ 371/9.1 |
| 5,231,640 | * | 7/1993 | Hanson et al. ....................... 371/9.1 |
| 5,243,607 | * | 9/1993 | Masson et al. ...................... 371/69.1 |
| 5,390,103 | * | 2/1995 | Sakakibara ............................ 371/91 |
| 5,423,024 | * | 6/1995 | Cheung ................................ 395/575 |
| 5,452,443 | * | 9/1995 | Oyamada et al. ............. 395/182.08 |

* cited by examiner

*Primary Examiner*—Christine T. Tu
(74) *Attorney, Agent, or Firm*—Akin, Gump, Strauss, Hauer & Feld, LLP

(57) ABSTRACT

A method and apparatus for comparing the real time operation of two object code compatible processors to discover incompatibilities and provide fault-tolerance in a computer system. The two processors run the same code and compare their write operations in real time. Logic external to the processors arbitrates between them, granting only one processor access to the system bus at any one time. The first processor executes instructions until it reaches a write or I/O data read cycle, at which time control of the system bus passes to the second processor. The second processor executes the instructions previously executed by the first processor until it catches up to the cycle pending on the first processor. If this cycle is a write cycle, then error detection logic compares the signals pending on the two processors to flag inconsistencies. If the cycle is an I/O data read cycle, the data provided to the first processor is latched to guarantee that the second processor receives the same data for its equivalent cycle. The invention includes logic circuitry which accounts for internal differences between the two processors as well as logic which allows the processors to compare their write operations while processing interrupts.

28 Claims, 17 Drawing Sheets

METHOD AND APPARATUS FOR COMPARING REAL TIME OPERATION OF OBJECT CODE COMPATIBLE PROCESSORS

This is a continuation of co-pending application Ser. No. 07/649,851, filed on Jan. 31, 1991 and Ser. No. 08/159,048, filed on Nov. 29, 1993.

BACKGROUND OF THE INVENTION

1. Field of the Invention

The present invention relates to a method and apparatus for comparing the real time operation of non-identical, object code compatible microprocessors to determine code compatibility or, alternatively to provide a measure of fault-tolerance in a computer system.

2. Description of the Prior Art

Computer systems are being called on to perform an ever-increasing number of functions and applications. As computer systems continue to play a greater role in modern society, the need for fault-tolerant computer systems has also grown. In general, a fault-tolerant computer system is defined as a system that can produce correct results or actions even in the presence of faults or anomalous conditions. Fault-tolerant computer systems were first developed for high-risk applications such as in hospitals, aviation, aerospace, etc. because these applications typically required a high degree of reliability. Today, however, fault-tolerance is also generally desired in more commonplace applications. For example, the failure of a single automated teller machine can cost a bank thousands of dollars. Therefore, due to the large number of applications in which computer systems are being used, many systems require some measure of fault-tolerance to guarantee that a processor or system error does not bring down the entire system.

The basic idea behind providing fault-tolerance is to incorporate extra or redundant resources into the system which can help overcome the effects of a malfunction. This redundancy can take the form of extra hardware, which can vote out an erroneous signal or switch in a spare to replace a failing subsystem, or additional software, which can allow successful re-execution of a program following detection of a failure.

One method used to provide fault-tolerance in computer systems entails using two or more identical processors in a computer system, one of which is referred to as the primary or active processor which actually operates the computer system. The remaining processors are standby processors that are only used in case of a complete failure by the primary processor. This type of system does not include any means for the detection of errors and is therefore only designed to tolerate a complete failure of the primary processor. This method therefore does not provide any measure of fault-tolerance where the primary processor erroneously executes an instruction or generates faulty data that goes undetected.

Another method used to provide fault-tolerance includes using two or more identical processors which compare their operations in real time to prevent errors or faulty data generated by any one processor from disrupting the system. This type of system may generally include a type of adaptive voting procedure whereby all of the processors compare their operations in real time and then "vote" on the correct response or operation. As an example, U.S. Pat No. 3,783, 250 to Fletcher et al titled "Adaptive Voting Computer System" discloses a computer system using adaptive voting to tolerate failures and operate in a fail safe manner.

The above method performs well under certain circumstances, but the use of identical processors in a fault-tolerant adaptive voting scheme provides that faulty data or faulty conditions may affect the processors in exactly the same way, thereby causing all of the processors to fail in the same manner. This problem primarily occurs where a design fault exists in the processor being used. Design faults include faults resulting from the design of the module or system, where "design" encompasses everything from system requirements to system realization during either initial production or future modifications. Design faults have become a problematic source of failures in computer systems because they defeat fault-tolerance strategies based on strict replication. For example, the use of redundant, identical microprocessors in a computer system will generally not be able to overcome a design fault because this fault will generally occur in all of the processors and will affect them all in the same way.

In order to combat design faults, many fault-tolerant computer systems are beginning to use a concept referred to as design diversity. Design diversity minimizes the occurrence of failures due to design faults through diversified design, which essentially means that two or more systems perform the same function through separate designs and realizations. An example of design diversity that would be required to overcome design faults in a computer system would be the use of non-identical, redundant microprocessors in the system. Therefore, a method and apparatus is desired which uses multiple processors to provide a measure of fault-tolerance in a computer system where the processors are not identical, but merely object code compatible. In this manner, design faults will generally not affect the processors in the same way, thereby increasing the likelihood that these types of faults can be detected and avoided.

Computer systems which include redundant processors generally encounter significant problems with regard to synchronization of the various processors. If the comparisons or voting are done in hardware, then tight coupling of the redundant processors is required to ensure that the voting takes place on valid data samples. In many computer systems which include identical, redundant processors, the processors have their corresponding pins connected to the same input/output lines and operate in lockstep. However, it is generally not possible to operate non-identical processors in lockstep with each other because internal differences between the two processors would cause difficulties. Therefore, a method is needed in which non-identical processors can operate together in a computer system while allowing their operations to be compared in real time.

Another consideration in computer system design is compatibility. A principal reason for the growth of the personal computer industry has been the conscious effort on the part of the industry to maintain compatibility between various generations of computer systems and software. Compatibility guarantees that software written for a certain computer system will operate correctly on more advanced computer systems developed in the future.

Compatible computer systems are built around a family of object code compatible microprocessors. In this manner, software written for a computer system with a certain microprocessor will be compatible with a later generation computer system which includes a more advanced microprocessor from this family of microprocessors. One example of compatible computer systems is the family of personal computers compatible with those previously manufactured and sold by International Business Machines Corp. (IBM). Personal computer systems that are IBM-compatible have been built around a family of microprocessors produced by Intel Corporation (Intel) referred to as the 8088 family of microprocessors. The Intel 8088 family of microprocessors includes the 8086, 8088, 80186, 80286, 80386, and now the 80486 microprocessor, and all of these microprocessors have been designed to be object code compatible.

Processors are called code compatible when they can run the same code and produce the same results given the same input. By running the same code, it is meant that the processors can understand and execute the same instructions, altering their internal states (registers, flags, etc.) in the same way in response to those instructions. Two processors may be code compatible even though they are internally different. An important element in microprocessor design is to guarantee that a new processor being designed is object code compatible with previous generations of the respective family of microprocessors.

Microprocessor designers have used various methods in order to guarantee that two supposedly object code compatible processors are actually compatible. The usual method for determining if two processors are code compatible is to run a set of programs on the newer computer system with the more advanced microprocessor which are known to execute correctly on a computer system incorporating the older microprocessor and to watch for anomalies. This method has several problems, one of which is detection. Although processor compatibilities generally produce obvious errors in the program output, sometimes the problem does not produce noticeable errors, even to the eyes of a trained observer. Once an error has been spotted, another problem that arises is accurately pinpointing the instruction causing the error and the circumstances under which the error occurred. This information is critical to microprocessor designers because it enables them to replicate and understand the malfunction. Pinpointing the instruction causing the error is difficult because errors detected by an observer are usually side effects of malfunctions that occurred much earlier in the program. In addition, current generation processors execute millions of instructions per second, further exacerbating the problem of finding a faulty instruction. To make matters worse, the tests are usually carried out using commercially available software, of which the user has no internal knowledge or ready access to the source code.

Another method to test the code compatibility of two microprocessors could be implemented by capturing a trace of execution of the same program on two computer systems using the processors and then comparing the traces. From a practical point of view, however, this method has some drawbacks in that it is very difficult to ensure that both programs are subject to the same input in both cases. For the method to work, both processors must read the same exact values for every memory or I/O read operation, and this may be almost impossible to ensure if the programs are running on different computer systems at different times. Therefore, it is desirable for a method and apparatus to automatically detect and locate processor incompatibilities in a computer system with a minimum of human intervention.

As previously mentioned, two processors may be code compatible even if they are internally different. For example, the 80386 and 80486 microprocessors are object code compatible microprocessors, but they include special internal differences which are not classified as incompatibilities. Most of the internal differences that arise between two object code compatible processors are due to the order in which the two processors write information. For example, in an instruction which causes a processor to write two data items to memory, one processor may write Item 1 first while the other processor may write Item 2 first. Another internal difference between two object code compatible processors that may occur is when one of the processors is known to execute extra write cycles under some circumstances.

Some background on the internal operation of the Intel 80486 microprocessor and the Intel 80386 microprocessor is deemed appropriate. The 80386 and 80486 microprocessors are object code compatible processors that each include a 32 bit address bus and a 32 bit data bus. The 80386 processor is designed to operate in conjunction with an external numeric co-processor and an external cache controller and cache. The 80486 microprocessor includes an internal, on-chip numeric co-processor as well as an internal, on-chip cache and cache controller. The 80386 and 80486 microprocessors each include a memory management unit. The memory management unit (MMU) comprises a segmentation unit and a paging unit. Segmentation allows the managing of the logical address space by providing an extra addressing component, one that allows easy code and data relocatability. Memory is organized into one or more variable length segments, each of which can range up to 4 Gigabytes in size. A given region of the linear address space (a segment) can have various attributes associated with it. These attributes include its location, size, type (i.e. stack, code or data), and protection characteristics.

The information about a particular segment in the linear address space is stored in an eight byte data structure referred to as a descriptor. Descriptors include attributes about a given segment such as the 32-bit base linear address of the segment, the 20-bit length and granularity of the segment, the protection level, read/write or execute privileges, and the default size. Each descriptor also includes a bit which determines whether or not the descriptor has been accessed, referred to as the Accessed bit. All of the descriptors in the computer system are included in tables recognized by hardware. A 16-bit value referred to as a segment selector is associated with each segment and points to its respective descriptor.

Each of the 80386 and 80486 microprocessors access a descriptor by performing two consecutive 4-byte read operations. The 80386 microprocessor, however, generally performs an extra write cycle to the descriptor table entry after it reads the eight byte descriptor. The 80486 microprocessor, on the other hand, performs the write cycle only when necessary. The 80486 processor also performs the two 4-byte read cycles in the opposite order of the 80386 microprocessor. It is generally assumed that the 80486 first reads the 4-byte portion of the descriptor which includes the Accessed bit, and if the bit is already set, it performs the next 4-byte read. However, if the Accessed bit is not set, then the 80486 processor performs a cycle referred to as a read-modify-write cycle before the second 4-byte read. It is important to note that read-modify-write cycles are LOCKed cycles.

The 80386 and 80486 microprocessors also perform some instructions in their instruction sets differently. One example is the PUSHA/PUSHAD instruction. The PUSHA/PUSHAD instruction copies the eight word or word (double word) internal registers of the respective microprocessor onto the top of the stack, thus eliminating the need for eight consecutive PUSH instructions. The 80386 microprocessor performs the PUSHA/PUSHAD instruction by starting with the current stack pointer address and incrementing in consecutive order down the stack for every write operation. The 80486 microprocessor, on the other hand, performs its first write at the address of the current stack pointer plus the number of writes it will execute in performing the instruction and then performs the write operations in the opposite order. It is generally assumed that the 80486 microprocessor is checking for a stack exception before it executes the PUSHA/PUSHAD instruction.

A Call instruction to an unaccessed page causes the 80486 and 80386 processors to execute memory cycles correct in functionality, but in different orders. When the 80386 and 80486 microprocessors receive a Call instruction to an unaccessed page in memory, then each of the processors performs a read-modify-write cycle in order to set an Accessed bit in the page table or page directory. The 80486 processor performs the read-modify-write cycle, and then it prefetches 4 cycles (16 bytes) from this address before pushing its instruction pointer (IP) for a Near Call or CS:IP for a Far Call. The 80386 pushes its CS:IP first before decoding the paged address and performing the read-modify-write sequence.

When the 80386 and 80486 processors are prefetching data and reach the end of a page in memory, then each of the processors checks the page's Accessed bit in the Page Table. If the page's Accessed bit is not set, then each processor performs a read-modify-write cycle to set the Accessed bit. A difference in instruction execution arises because the 80486 microprocessor prefetches much more than does the 80386, and therefore the 80486 reaches page boundaries much quicker. If the code at the end of the page comprises a large number of write operations, then the system write from the read-modify-write cycle is mixed in with the code generated write cycles from these write operations. The 80486 generally executes read-modify-write cycles in a different location in the respective code sequence than the 80386, and therefore the pattern of write cycles performed by the two processors may be different.

The 80486 and 80386 microprocessors also implement the FSAVE command differently. The FSAVE command stores the complete state of the 80387 numeric co-processor into a memory location. The state of the 80387 co-processor that is stored comprises seven 32-bit environment registers, the error pointer registers, and the complete floating point stack, which comprises eight 80-bit registers. Both processors store the same image in memory, but the execution patterns are different. Both processors store the seven 32-bit environment registers using 32-bit write cycles at consecutive locations. The difference occurs when the processors store the 80-bit stack registers. The 80386 performs 32 and 16 bit write cycles at consecutive addresses to store the stack registers, but the 80486 is more erratic, using non-consecutive addresses and single byte write cycles.

Another difference between the 80386 microprocessor and the 80486 microprocessor is the order in which they execute interrupt acknowledge cycles. For example, it has been found that the processors execute interrupt acknowledge cycles at different times after their respective Interrupt Enable Flag bits have been reset by either an STI or POPF instruction.

Some background on interrupt handling in computer systems is deemed appropriate. An interrupt is an event asynchronous to the processor which forces it to execute from a certain location. In order for the processor to return to the place where it was originally executing from, a "return address" is pushed (written) on the stack. The actual address of the location that holds that value depends on the contents of a processor register known as the "stack pointer". In general, if there are multiple processors operating in a computer system then there is no way to assure that the value of the stack pointer for each will be the same at the time they acknowledge the interrupt. Additionally, there is no guarantee that two processors will execute the exact same number of instructions, and therefore the exact same number of writes, in the period between the time when the interrupt was received and the time that it was acknowledged.

Thus, even though the 80386 and 80486 microprocessors are object code compatible, they cannot operate in lockstep because of the above internal differences. Also, a loose coupling of the two processors is inadequate for the reasons described above. In a loose coupling scheme, there is no way to guarantee that the processors receive the same input. In addition, it is extremely difficult to pinpoint the source of an error in a loose coupling scheme. Therefore, a new method utilizing a form of intermediate coupling between two processors is desired which provides for fault tolerance and allows a user to guarantee that two processors are object code compatible. It is desirable for this loose coupling scheme to be able to account for internal differences between the two processors and also guarantee that the two processors receive the same input.

SUMMARY OF THE INVENTION

The present invention includes a method and apparatus for comparing the real time operation of two microprocessors, preferably non-identical object code compatible microprocessors, to automatically detect processor incompatibilities and/or inconsistent operation with a minimum of human intervention. The present invention operates according to the theory that, regardless of architectural differences, two object code compatible processors must produce the same output if they run the same code and are given the same input. Therefore, the present invention compares the sequence of write operations produced by the two processors in order to decide if the processors produce the same output. The two processors run exactly the same code and their write operations are compared in real time.

The preferred embodiment of the invention comprises a microprocessor board referred to as the Fault Tolerance Detection board which includes two slots referred to as primary and secondary slots where microprocessor modules may be inserted. The Fault Tolerance Detection board also includes processor control logic, error detection logic, and specialized logic which accounts for the internal differences between the respective processors on the processor modules placed in the respective slots. The processor on the respective module in the primary slot is referred to as the main or P1 processor and the processor on the module in the secondary slot is referred to as the secondary or P2 processor. Control logic on the Fault Tolerance Detection Board associated with each of the processors is used to control the respective processor's access to the system bus, granting only one processor access to the system bus at any one time. The processor control logic for each of the processors control their respective processors access to the system bus by trapping their address strobe or ADS* output and generating "fake" signals to the system bus, and also trapping the responding unit ready or READY* input signal from the system bus and generating "fake" signals to each of the processors, respectively.

For the purpose of the present invention, a synchronization cycle is defined as a cycle which causes the control logic for a respective processor to yield control of the system bus to the other processor. All write cycles and I/O (input/output) data read cycles are classified as synchronization cycles. When one processor starts a synchronization cycle, also referred to as a non-memory read or NMR cycle, the other processor is granted access to the system bus before the cycle on the first processor is propagated to the system bus. The pending cycle on the first processor is started after the first processor regains control.

The processors are initially synchronized through a system reset at power on of the computer system, which places the two processors in the same known state and makes them begin execution at the same address. Upon the system reset, the P1 processor is granted the bus first. The P1 processor begins executing code, and the control logic for the P1 processor yields control of the bus to the P2 processor when the P1 processor begins a non-memory read or NMR cycle. The P2 processor gains control of the bus, and it executes the instructions that were previously performed by the P1 processor until it catches up to the NMR cycle pending on the P1 processor's bus lines. When the P2 processor begins the NMR cycle, the P2 processor control logic returns control of the system bus to the P1 processor, which then executes the pending NMR cycle. The NMR cycle performed by the P2 processor is not propagated to the system bus.

If the NMR cycle performed by the two processors is a write cycle, then error detection logic compares the two cycles performed by each of the processors to flag processor inconsistencies. The error detection logic on the Fault Tolerance Detection board compares the address and data signals of the two processors on all write operations at the time that the control logic for the P2 processor yields back to the P1 processor.

If the NMR cycle performed by the P1 processor is an I/O read cycle, then the data received by the P1 processor is latched so that the P2 processor can receive this same data when it regains control of the system bus and completes the NMR cycle. Therefore, I/O read cycles performed by the P2 processor are terminated with the same data received by the P1 processor for its equivalent cycle, and therefore these cycles need not propagate to the system bus. This method for manipulating I/O read cycles assures that both processors receive exactly the same input without overly restricting their read operations.

Therefore, by avoiding checks on all read cycles, the present invention continues operation even if the read streams of the two processors show little resemblance. Discrepancies are flagged when write cycles occur on the P2 processor. At that time, the same write cycle is pending on the P1 processor, and address and data from both processors are available for comparison. The error detection logic flags a mismatch on either address or data in order to discover incompatible or inconsistent operation of the two processors.

The present invention includes logic circuitry which accounts for special internal differences between the P1 processor, an 80486 microprocessor according to the preferred embodiment, and the P2 processor, an 80386 microprocessor according to the preferred embodiment. The present invention includes logic circuitry which accounts for instances where the 80386 microprocessor performs an extra write cycle to the Descriptor Table entry after it reads the eight byte descriptor. Logic is also included which accounts for the manner in which the 80486 and the 80386 perform the PUSHA/PUSHAD instructions in the opposite order, which causes eight consecutive mismatches on non-memory read cycles. The present invention also includes logic circuitry which accounts for the manner in which the 80386 and the 80486 microprocessors perform certain paging operations differently such as a Call to an unaccessed page or prefetches across page boundaries. When the two processors execute instructions differently such that the internal difference logic can not accommodate these differences and resynchronize the processors, then this logic asserts a "kill" signal which disables the P2 processor and the error detection logic until a hardware interrupt occurs. The hardware interrupt will generate the RESET signal to resynchronize the two processors.

The present invention includes a method which allows comparison of the real time operation of the two processors during interrupt processing. This method comprises reinitializing the processors after every interrupt to make sure they are in synchrony before they enter the interrupt handler. The control logic presents hardware interrupts only to the P1 processor, and the P1 processor does not yield any more after a hardware interrupt has been requested. Hardware interrupts also disable both the P2 processor and the error detection logic. The operating system includes a TSR program which ensures that all hardware interrupts make the P1 processor execute a common piece of code, the purpose of which is to resynchronize the processors before the interrupt service routine is invoked. This code saves the state of the P1 processor and then performs a soft boot. The boot vector is changed so that, after reboot, control returns to the portion of the program that just saved the processor state. The reboot re-initializes the state of both processors as well as enabling both the P2 processor and the error detection logic. After reboot, the processors return to the re-synchronizer code, and they both execute code that restores the processor state of the P1 processor that was saved prior to the reboot, thereby placing each of the processors in the same state. This guarantees that the P2 processor has the same state as the P1 processor upon entrance to the interrupt service routine.

When the Fault Tolerance Detection board is used for fault tolerance or code compatibility purposes, both the P1 and P2 processors are activated and are operating as described above. However, the present invention includes a method which enables an operator to deactivate either of the P1 and P2 processors, leaving the other processor as the sole processor operating. This feature is preferably used when the operator is determining the code compatibility of two processors, and this feature allows the operator to deactivate one of the processors and run code on the other processor operating alone to ensure that the code runs properly on the respective processor.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
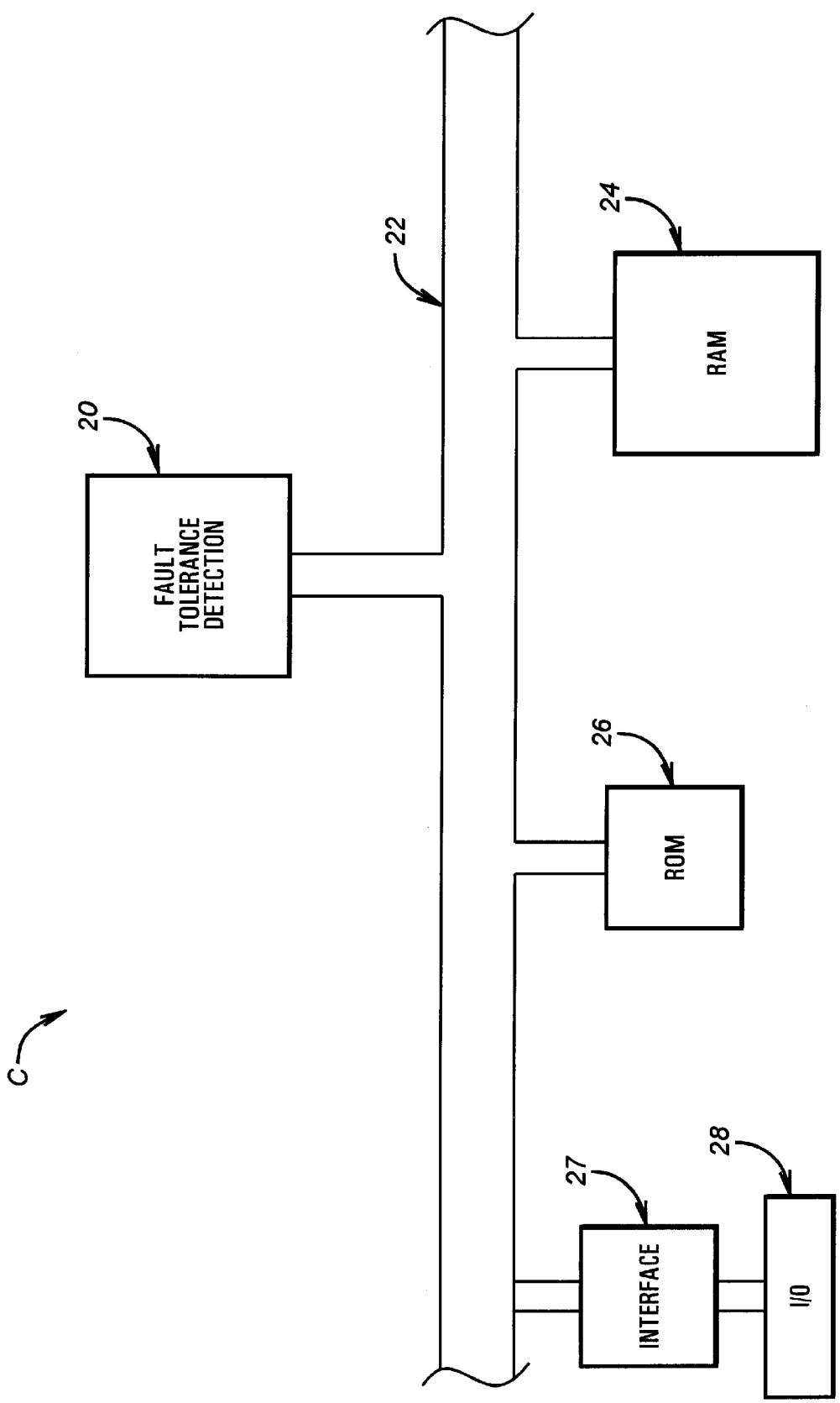
FIG. 1 is a block diagram of a computer system incorporating a Fault Tolerance Detection board according to the present invention.

Referring now to FIG. 1, a computer system C incorporating the present invention is generally shown. Many of the details of a computer system that are not relevant to the present invention have been omitted for the purpose of clarity. The computer system C is preferably compatible with those previously manufactured and sold by International Business Machines Corporation (IBM). In the description that follows, a signal followed by an asterisk indicates that the signal is asserted when it has a low logic level and is the inverse of the same signal name without an asterisk.

The present invention comprises a computer microprocessor board referred to as the Fault Tolerance Detection board or FTD board 20, which is coupled to a computer system bus 22. The system bus 22 includes an address bus, data bus, and control bus. Also coupled to the system bus 22 are random access memory (RAM) 24 and read only memory (ROM) 26. The RAM 24 preferably includes instructions or program code which processors on the FTD board 20 execute. The RAM 24 also includes a terminate-and-stay-resident (TSR) program according to the present invention whose purpose is to resynchronize the processors on the FTD board 20 before hardware interrupt service routines are invoked. A TSR program is conventionally a program which stays in memory and traps interrupt calls, either hardware or software, by placing vectors to its code in the place of the existing interrupt vectors. Upon completion of the TSR program operations, control proceeds to the address indicated by the previous vector. The TSR program according to the present invention inserts itself in the interrupt code chain only during hardware interrupts.

Bus master devices and input/output (I/O) devices (not shown) may also be coupled to an I/O bus 28 that is preferably separate from the system bus 22 and coupled to the system bus 22 through an I/O interface 27. The I/O bus 28 is preferably based on the industry standard architecture (ISA), a bus architecture introduced in the International Business Machines (IBM) PC/AT personal computer, or the extended industry standard architecture (EISA), an extension of the ISA. If the present invention is used to determine the code compatibility of two processors, external instruments (not shown) such as trace or logic analyzers may be attached to the FTD board 20 so that operational comparisons performed between the processors on the FTD board 20 can be recorded for later analysis.

Figure 2:
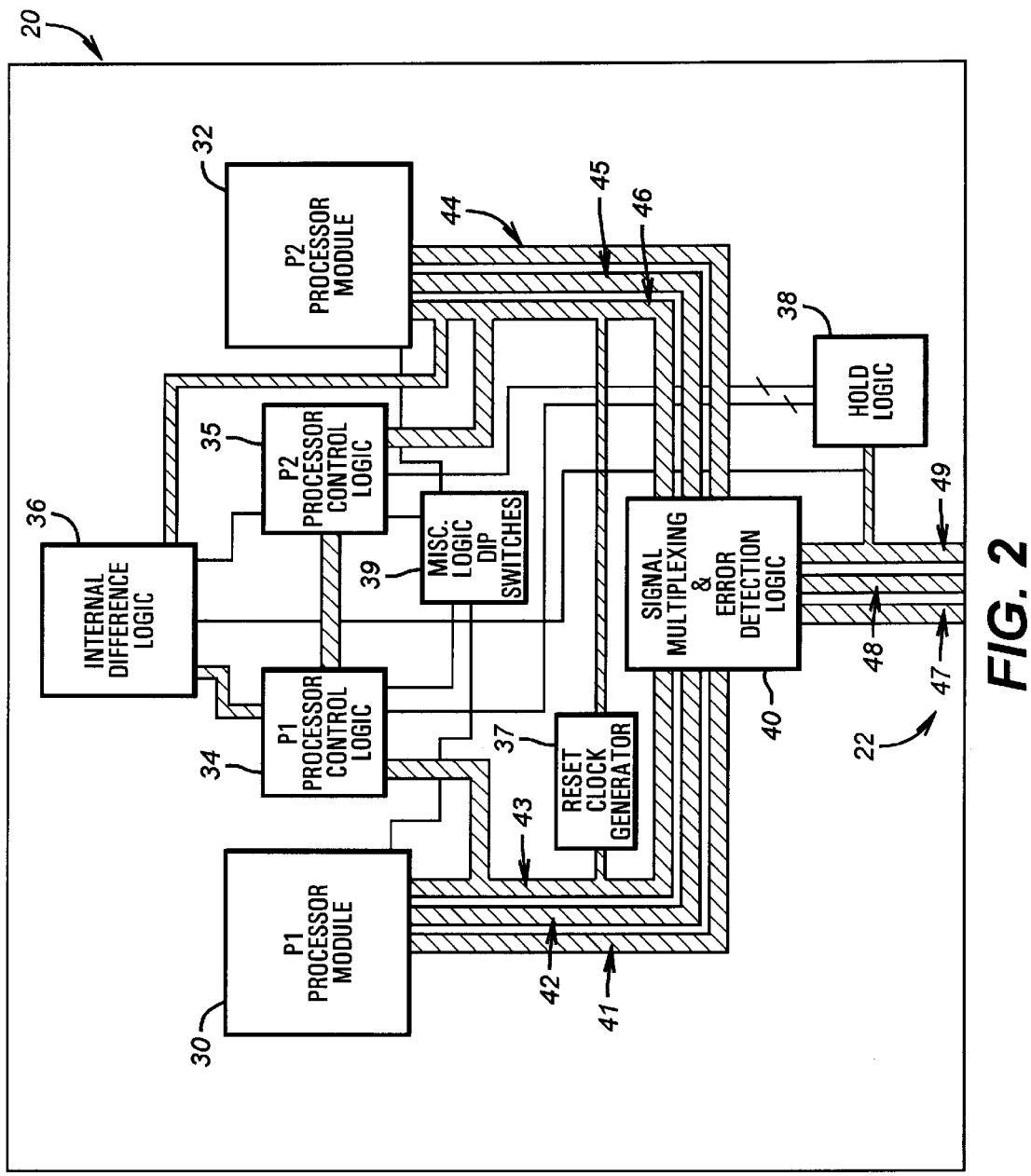
FIG. 2 is a block diagram of the Fault Tolerance Detection board of FIG. 1 according to the present invention.

The FTD board 20 includes slots for two processor modules referred to as primary and secondary slots according to the present embodiment. Referring now to FIG. 2, a processor module referred to as the P1 processor module 30 is inserted in the primary slot, and a processor module referred to as the P2 processor module 32 is inserted in the secondary slot. In the preferred embodiment, the P1 processor module 30 includes a P1 processor, which is an 80486 microprocessor from Intel, while the P2 processor module 32 includes a P2 processor, which is an 80386 microprocessor. Because the preferred 80486 P1 processor includes an internal numeric co-processor, the P2 processor module 32 includes a numeric co-processor, preferably an Intel 80387 numeric co-processor, which is coupled to the 80386 microprocessor to allow more complete comparisons to be developed. The 80486 processor includes an internal cache which is enabled according to the preferred embodiment. In an alternate embodiment of the invention, two 80486 processors, one intended to operate at 33 Mhz and one intended to operate at 50 Mhz, serve as the P1 and P2 processors. In this embodiment, the two 80486 processors are operated at the same frequency, preferably 20 Mhz. In general, any two object code compatible processors may be used as the P1 and P2 processors of the present invention. The use of interchangeable processor modules allows the type of P1 and P2 processors to be easily changed by merely replacing one processor module with another module that includes a different processor.

The P1 processor includes an address bus 41, data bus 42, and control bus 43 connected to signal multiplexing and error detection logic 40. The P2 processor includes an address bus 44, data bus 45, and control bus 46 connected to the signal multiplexing and error detection logic 40. The multiplexing and error detection logic 40 multiplexes the address, data, and control signals generated by the P1 processor and the P2 processor onto the address bus 47, data bus 48, and control bus 49 of the system bus 22, depending on which of the processors has control of the system bus 22. The multiplexing and error detection logic 40 also compares write operations performed by the two processors in real time for the purposes of fault-tolerance or, alternatively, to determine the code compatibility of the two processors.

The FTD board 20 includes control logic 34 and 35 associated with the P1 processor and P2 processor respectively. The P1 processor control logic 34 is connected to the control bus 43 of the P1 processor and the P2 processor control logic 35 is connected to the control bus 46 of the P2 processor. The P1 processor control logic 34 and P2 processor control logic 35 control the respective processors' access to the system bus 22 according to the present invention, as is explained below. The FTD board 20 includes a block circuit 39 which includes a number of DIP switches that provide signals to the processor control logic 34 and 35. The block circuit 39 also includes logic which receives signals from the DIP switches and provides signals to the P1 and P2 processor modules 30 and 32. The FTD board 20 includes HOLD logic 38 which receives signals from each of the P1 processor and P2 processor control logic 34 and 35. The HOLD logic 38 receives HOLD requests from the computer system C on the system control bus 49 and generates the corresponding hold acknowledge signal back to the computer system C. The HOLD logic 38 also provides the hold acknowledge signal to the P1 and P2 processor control logic 34 and 35.

The FTD board 20 further includes internal difference logic circuitry 36 which accounts for certain internal differences between the 80386 and 80486 processors, which are the P1 and P2 processors of the preferred embodiment. It should be noted that if identical P1 and P2 processors are being used, such as two 80486 microprocessors, then internal difference logic is unnecessary. The internal difference logic 36 receives the hold acknowledge signal from the HOLD logic 38 as well as a control signal generated by the P2 processor control logic 35. The internal difference logic 36 is also connected to the P1 processor control logic 34 and the P2 processor control bus 46. The FTD board 20 also includes reset signal and clock signal generation circuitry 37 which is connected to the P1 processor and P2 processor control buses 43 and 46.

Figure 3:
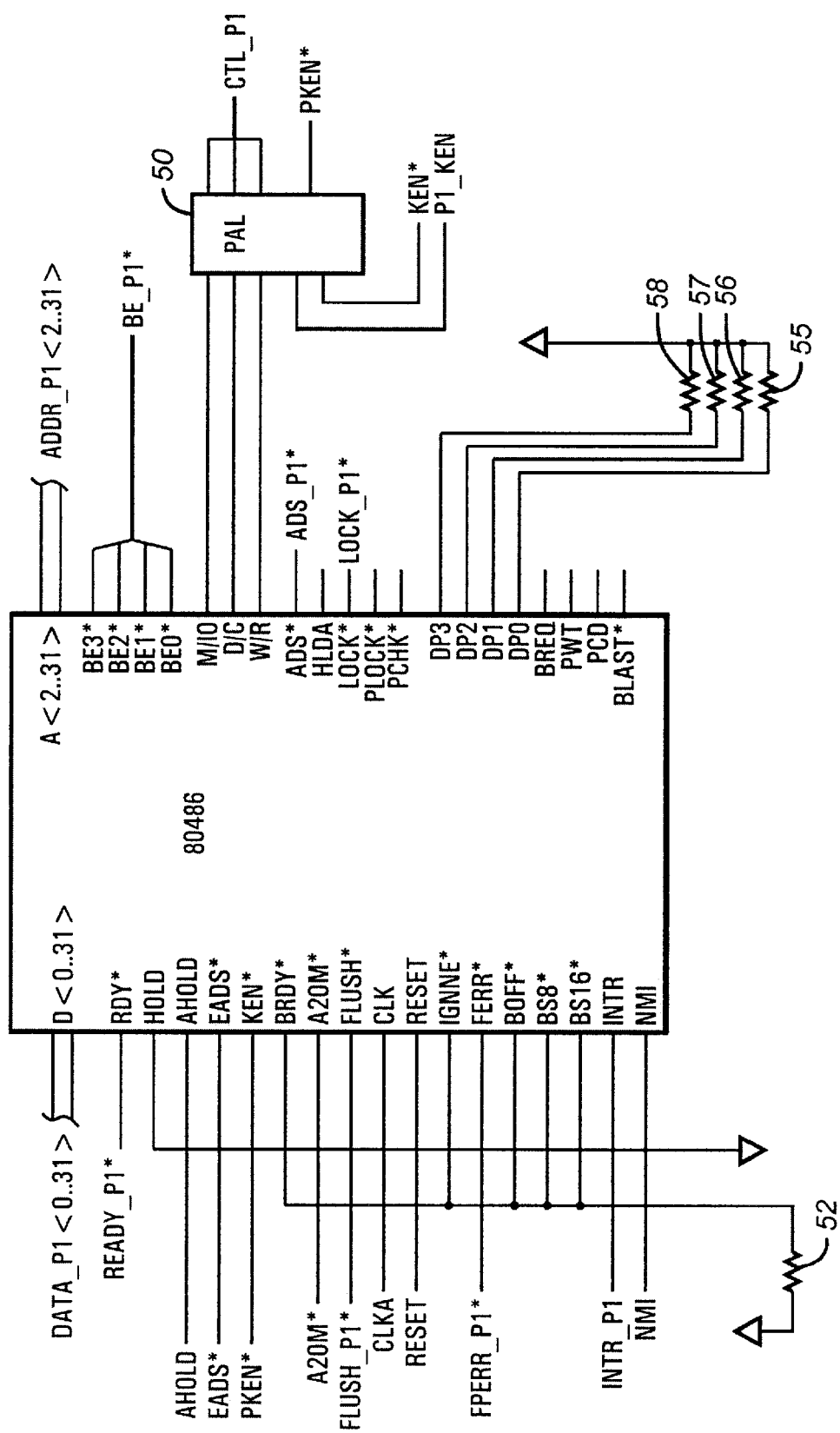
FIGS. 3 is a schematic diagram illustrating the P1 processor and associated circuitry on the P1 processor module of FIG. 2.

Referring now to FIG. 3, the configuration of the 80486 microprocessor, which serves as the P1 processor on the P1 processor module 30 according to the preferred embodiment, is shown. The various input and output pins of the 80486 are briefly discussed below to demonstrate the configuration of the 80486 as the P1 processor in the preferred embodiment. For more information on the input and output pins of the 80486 microprocessor, please refer to the Intel i486 Microprocessor Handbook, November 1989 Edition, published by Intel Corporation, which is hereby incorporated by reference.

The 80486 microprocessor includes 32 data pins which generate and receive data signals referred to as the DATA_P1<0 . . . 31> signals. The DATA_P1<0 . . . 31> signals comprise the P1 processor data bus 42. The 80486 includes address pins which receive and generate signals referred to as the ADDR_P1<2 . . . 31> signals. The ADDR_P1<2 . . . 31> signals comprise the P1 processor address bus 41. The remaining 80486 signals discussed below comprise the P1 processor control bus 43. The 80486 microprocessor includes four byte enable signals referred to as BE3*, BE2*, BE1* and BE0*. The byte enable signals are active low signals which indicate active bytes of data during read and write cycles. The assertion of the BE3* signal indicates that the upper byte of data represented by the DATA_P1<24 . . . 31> signals is active. The assertion of the BE2* signal indicates that the byte of data represented by the DATA_P1<16 . . . 23> signals is active. The assertion of the BE1* signal indicates that the byte of data represented by the DATA_P1<8 . . . 15> signals is active, and the assertion of the BE0* signal indicates that the lower byte of data represented by the DATA_P1<0 . . . 7> signals is active. The BE0* signal, the BE1* signal, the BE2* signal and the BE3* signal are hereinafter collectively referred to as the BE_P1* signals for clarity. The RDY* input of the 80486 receives a ready signal generated by P1 processor control logic 34 referred to as READY_P1*. The P1 processor control logic 34 traps the system bus RDY* signal and generates the READY_P1* signal to control the 80486 processor's access to the system bus 22 according to the present invention.

As previously mentioned, the internal cache of the 80486 is enabled according to the preferred embodiment. The AHOLD, EADS*, KEN* and FLUSH* input pins receive signals referred to as AHOLD, EADS*, PKEN*, and FLUSH_P1*, respectively. The EADS*, PKEN* and FLUSH_P1* signals are generated by logic on the FTD board 20, as explained below. The AHOLD signal is generated by the HOLD logic 38. A clock signal referred to as CLKA is connected to the CLK input of the 80486 microprocessor. The CLKA signal is generated by the reset signal and clock generation circuitry 37 and preferably has a frequency of 20 Mhz according to the preferred embodiment. A signal referred to as RESET is connected to the RESET input of the 80486 microprocessor. The RESET signal is also generated by the reset signal and clock generation circuitry 37, as is described below. The FERR* or floating point error output pin of the 80486 processor generates a signal referred to as FPERR_P1*. The FPERR_P1* signal is asserted low when a floating point error occurs. The FPERR_P1* signal is preferably routed down to the IREQ<13> line of an interrupt controller (not shown) in the system C, as is common in IBM-compatible computers. An interrupt signal referred to as INTR_P1 is connected to the INTR input of the 80486 microprocessor. The computer system interrupt signal INTR is trapped by logic on the FTD board 20, and the INTR_P1 signal is provided to the P1 processor. In the preferred embodiment, the INTR_P1 signal is asserted when the INTR signal is asserted. The INTR signal is asserted to a logic high value to indicate that an external interrupt has been generated by the computer system C. If the internal interrupt flag is set in the EFLAGS register, the 80486 generates two locked interrupt acknowledge cycles in response to the INTR pin going active.

The bus hold request input HOLD of the 80486 processor is connected to a logic low value. Therefore, the 80486 microprocessor is never placed into its HOLD state according to the preferred embodiment of the present invention. The system bus HOLD signal generated by the computer system C is provided to the HOLD logic 38 on the FTD board 20, which asserts the appropriate hold acknowledge signal back to the system C. The non-maskable interrupt or NMI input of the 80486 processor receives a signal referred to as NMI from the computer system C according to the preferred embodiment.

The burst ready input BRDY*, the ignore numeric error input IGNNE*, the back-off input BOFF*, and the bus size inputs BS8* and BS16* are all connected through a resistor 52 to a logic high value. The BRDY* input performs the same function during a 80486 burst cycle that the RDY* input performs during a non-burst cycle. The BRDY* input is tied to a logic high value because burst cycles are not performed by the 80486 microprocessor in the preferred embodiment. The IGNNE* input is asserted low to the 80486 microprocessor to allow it to ignore a numeric error and continue executing non-controlled floating point instructions. The IGNNE* input is connected to a logic high value to simplify the processor control logic 34 on the preferred embodiment of the FTD board 20. The BOFF* input is a bus arbitration input that is not being used in the preferred embodiment of the present invention because control logic 34 and 35 on the FTD board 20 control the arbitration between the P1 and P2 processors for control of the system bus 22. The BS8* and BS16* inputs are bus size control inputs that are connected to a logic high value because these signals are not used. The BS8* and BS16* inputs are not used because the bus architecture used in the preferred embodiment is such that the 32 bit processor/memory bus is separate from the I/O bus, and therefore 8-bit or 16-bit I/O cards are not directly coupled to the 80486.

The A20M* input pin receives a signal referred to as A20M* from the system C, as is standard in IBM-compatible computers. The FLUSH* input receives a signal referred to as FLUSH_P1* from the FTD board 20, as is explained further below. The data parity pins DP0, DP1, DP2, and DP3 are not used in the preferred embodiment of the present invention and are connected through pull-up resistors 55, 56, 57, and 58, respectively, to a logic high value. The ADS* output pin of the 80486 generates a signal referred to as ADS_P1*. The LOCK* output pin generates a signal referred to as LOCK_P1*. The HLDA, PLOCK*, PCHK*, BREQ, PWT, PCD and BLAST* output pins of the 80486 are not connected according to the preferred embodiment of the present invention.

The output pins M/IO, D/C, and W/R are connected to three inputs of a programmable array logic (PAL) device 50. The PAL 50 generates the MIO, DC, and WR bus signals that are output from the P1 processor module to the system bus 22, and these signals are collectively referred to as the CTL_P1 signals. The equations for the MIO, DC, and WR signals generated by the PAL 53 are as follows:

MIO=M/IO·D/C+M/IO·W/R*+M/IO*·D/C*·W/R

DC=D/C
WR=W/R

The 80486 encodes special cycles differently than does the 80386, and the PAL 50 changes the encoding of the signal generated from the M/IO output pin to account for this and to prevent incompatibilities from occurring on the system bus 22.

The PAL 50 also receives signals generated from the FTD board 20 referred to as KEN* and P1_KEN. The KEN* signal is generated by logic in the block circuit 39 and is asserted low when the internal cache on the P1 processor is enabled by the computer system C. The P1_KEN signal is output from a DIP switch in the block circuit 39 and is asserted when an operator opens the DIP switch according to the present embodiment. The DIP switch which provides the P1_KEN signal allows an operator to selectively enable or disable the internal cache in the 80486 processor. The PAL 50 generates the PKEN* signal to the KEN* input of the 80486 when both the KEN* and P1_KEN signals are asserted.

Figure 4:
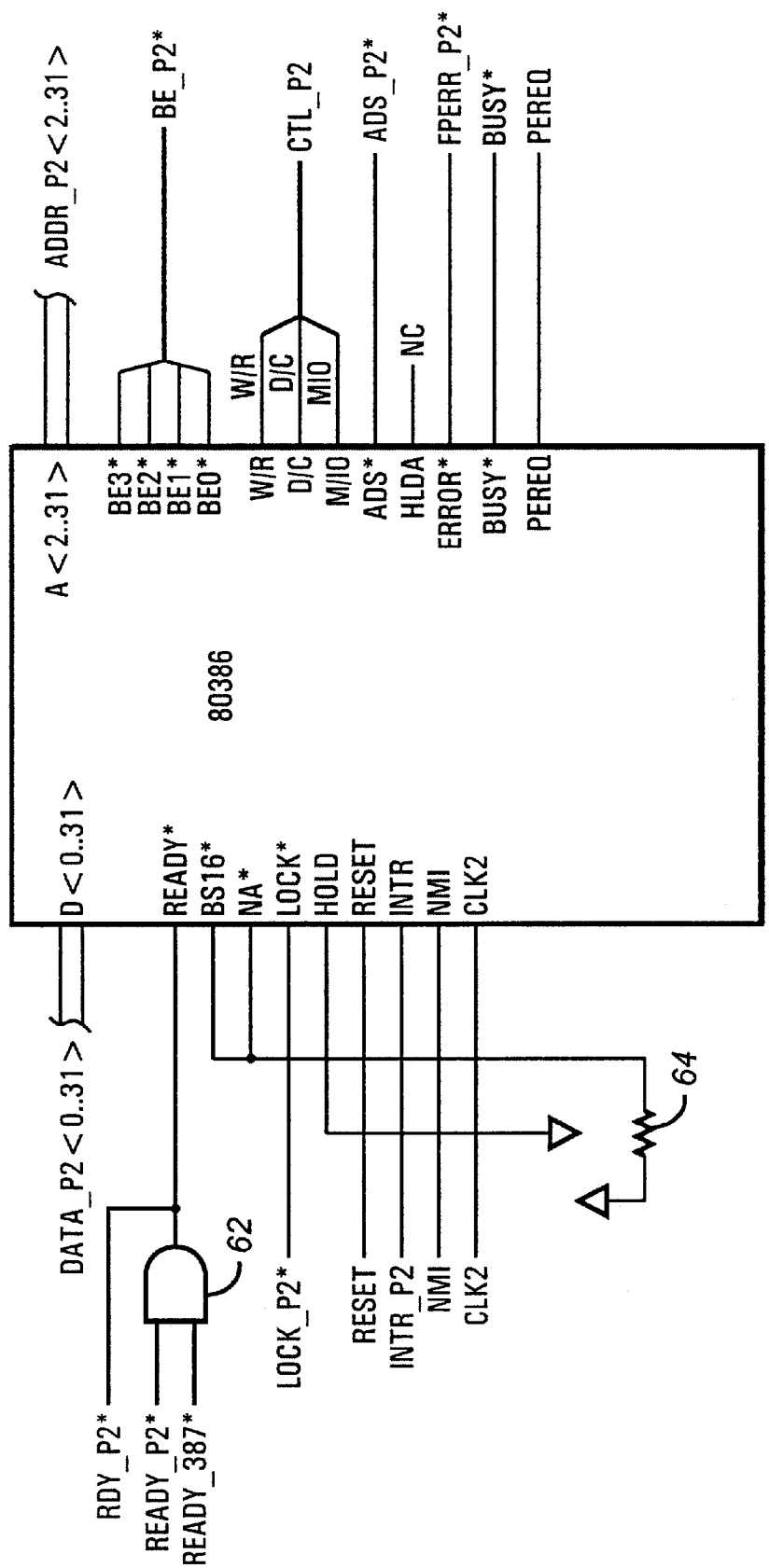
FIGS. 4 and 5 are schematic diagrams illustrating the P2 processor and numeric co-processor on the P2 processor module of FIG. 2.

Referring now to FIG. 4, the configuration of the 80386 microprocessor as the processor on the P2 processor module 32 according to the preferred embodiment is shown. The various input and output pins of the 80386 microprocessor are briefly discussed below to demonstrate the configuration of the 80386 as the P2 processor according to the preferred embodiment. For more information on the various input and output pins of the 80386 microprocessor, please refer to the Intel Microprocessor and Peripheral Handbook, 1989 Edition, Vol. I, published by Intel Corporation, which is hereby incorporated by reference.

The 80386 microprocessor includes 32 data pins which generate and receive data signals referred to as the DATA_P2<0 . . . 31> signals. The DATA_P2<0 . . . 31> signals comprise the P2 processor data bus 45. The 80386 microprocessor includes 30 address pins which generate and receive address signals referred to as the ADDR_P2<2 . . . 31> signals. The ADDR_P2<2 . . . 31> signals comprise the P2 processor address bus 44. The remaining 80386 signals discussed below comprise the P2 processor control bus 46. The 80386 includes four byte enable output pins which generate byte enable signals referred to as BE0*, BE1*, BE2* and BE3*, referred to collectively as the BE_P2* signals. Two signals referred to as READY_P2* and READY_387* are connected to the inputs of a two input AND gate 62 whose output is a signal referred to as RDY_P2*. The RDY_P2* signal is connected to the READY* input of the 80386 microprocessor and the 80387 numeric coprocessor. The RESET signal generated by the reset and clock generation circuit 37 is connected to the RESET input of the 80386 microprocessor. A clock signal generated by the clock generation circuit 37 referred to as CLK2 is connected to the CLK2 input of the 80386 processor. The CLK2 signal preferably has a frequency of 40 Mhz according to the preferred embodiment. The 80386 processor includes internal logic which divides the 40 Mhz signal that it receives at its CLK2 input to form the 20 Mhz signal at which it operates. Therefore, the 80486 and 80386 processors both operate at a frequency of 20 Mhz according to the preferred embodiment of the present invention.

The BS16* input and a next address request input referred to as NA* are connected through a resistor 64 to a logic high value. The NA* input pin is used to request address pipelining on the 80386 microprocessor, and this input is tied to a logic high value because address pipelining is not used according to the present invention. The BS16* input is tied high because, as already noted, the system C of the preferred embodiment utilizes a 32 bit system with a separate bus controller handling any 8 or 16 bit slave device problems. The HOLD input is tied to a logic low value. Therefore, the 80386 microprocessor is never placed into its HOLD state according to the preferred embodiment of the present invention. As already noted, system bus HOLD requests generated by the computer system C are provided to the HOLD logic 38 on the FTD board 20, which asserts the appropriate hold acknowledge signal back to the system C.

The INTR input receives a signal referred to as INTR_P2 from the FTD board 20. The INTR_P2 signal is provided by logic or the FTD board 20, which traps the system INTR signal. In the preferred embodiment, the INTR_P2 signal is negated low in all instances except when the P1 processor is deactivated and the P2 processor is the sole processor active. As is explained below, hardware interrupts are treated as special cases and are handled only by the P1 processor when the P1 processor is active because they are asynchronous to the operation of the processors and therefore there is no guarantee that the processors will enter the interrupt routine at the same time or in the same state. Software interrupts are synchronous interrupts and are treated in a manner similar to other synchronous instructions. The NMI input receives the NMI signal from the system C.

The W/R, D/C, and M/IO output pins of the 80386 generate signals referred to as WR, DC, and MIO, respectively, which are collectively referred to as the CTL_P2 signals. The LOCK* output pin of the 80386 generates a signal referred to as LOCK_P2*. The 80386 co-processor error input pin ERROR* receives an input signal referred to as FPERR_P2*, which is an error signal generated by the associated 80387 numeric co-processor. The FPERR_P2* signal indicates, when asserted low, that the previous co-processor instruction generated a co-processor error. The 80386 monitors the status of the FPERR_P2* signal during power up of the computer system C to determine the type of numeric co-processor installed, which may be either an 80287 or 80387 in the preferred embodiment. The ADS* or address strobe output pin of the 80386 microprocessor generates a signal referred to as ADS_P2*. The BUSY* input pin receives a co-processor signal referred to as BUSY*, and the co-processor request input pin PEREQ receives a co-processor signal referred to as PEREQ. The HLDA output pin of the 80386 is a no connect.

Figure 5:
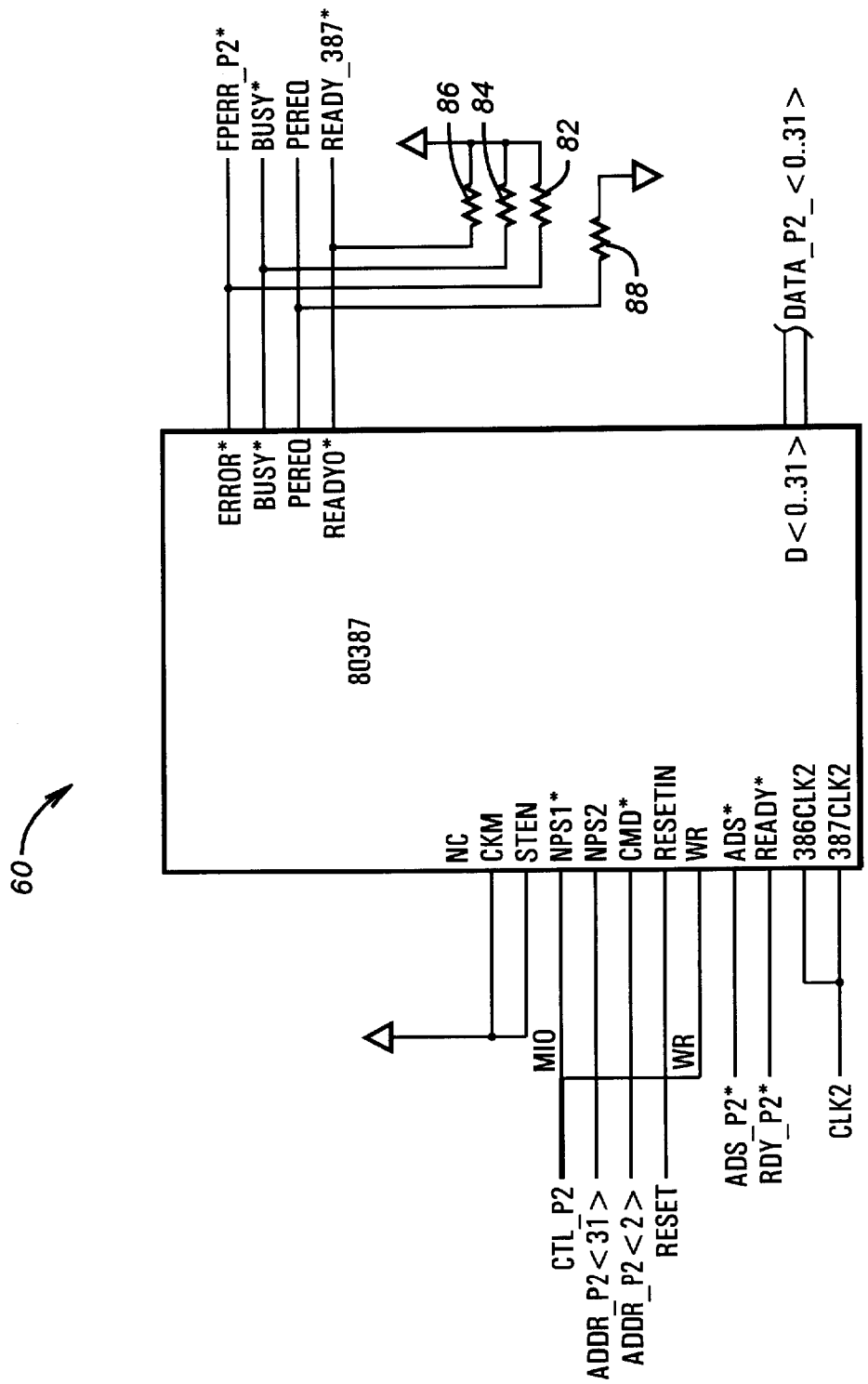

Referring now to FIG. 5, the P2 processor module 32 includes a numeric co-processor 60, preferably an Intel 80387 numeric co-processor, that is coupled to the 80386 processor. The clocking mode input CKM and the status enable input STEN of the 80387 are both tied to a logic high level. The MIO signal and the WR signal of the CTL_P2 signals generated by the 80386 microprocessor are connected to the NPS1* input and the WR input, respectively, of the 80387 numeric co-processor. The ADDR_P2<31> signal and the ADDR_P2<2> signal are connected to the NPS2 and CMD* inputs, respectively, of the 80387 co-processor. The above 80387 signal input pin connections are standard for operation of the 80387 with the 80386 microprocessor, as is well known to those skilled in the art. The RESET signal is connected to the RESETIN input pin of the 80386 coprocessor. The ADS_P2* signal and the RDY_P2* signal are connected to the ADS* and READY* input pins, respectively, of the 80387 numeric coprocessor. The CLK2 signal is connected to clock inputs 386CLK2 and 387CLK2 of the 80387 numeric coprocessor 60.

The error status output pin ERROR* generates the FPERR_P2* signal, which is connected through a resistor 82 to a logic high value. The busy status output pin BUSY* generates the BUSY* signal, which is connected through a resistor 84 to a logic high value. The ready output pin READYO* generates the READY_387* signal, which is connected through a resistor 86 to a logic high value. The processor extension request output PEREQ generates the PEREQ signal, which is tied through a resistor 88 to a logic low value. The 80387 numeric coprocessor includes 32 data pins which are coupled to the DATA_P2<0 . . . 31> signals generated by the 80386 microprocessor. For more information on the input and output pins of the 80387, please refer to the 1989 Intel Microprocessor and Peripheral Handbook, Volume I, published by Intel Corporation.

Referring again to FIG. 2, the block circuit 39 includes four DIP switches (not shown) which generate the P1_KEN signal and signals referred to as P2_KEN, SOLO_P1, and SOLO_P2. In the preferred embodiment, a closed DIP switch indicates that a respective signal is not active. As previously discussed, the P1_KEN signal DIP switch is preferably open, and the P1_KEN signal is asserted to enable the internal cache of the 80486 P1 processor. The P2_KEN signal indicates, when asserted high, that a cache on the P2 processor module 32 is active. Since the P2 processor module 32 does not include a cache in the preferred embodiment, the DIP switch which generates the P2_KEN signal is closed, and the P2_KEN signal is negated. The SOLO_P1 and SOLO_P2 signals indicate, when asserted high, that only the P1 and P2 processors are enabled, respectively. In the preferred embodiment, the SOLO_P1 and SOLO_P2 DIP switches are closed, and the SOLO_P1 and SOLO_P2 signals are both negated.

Figures 6, 7:
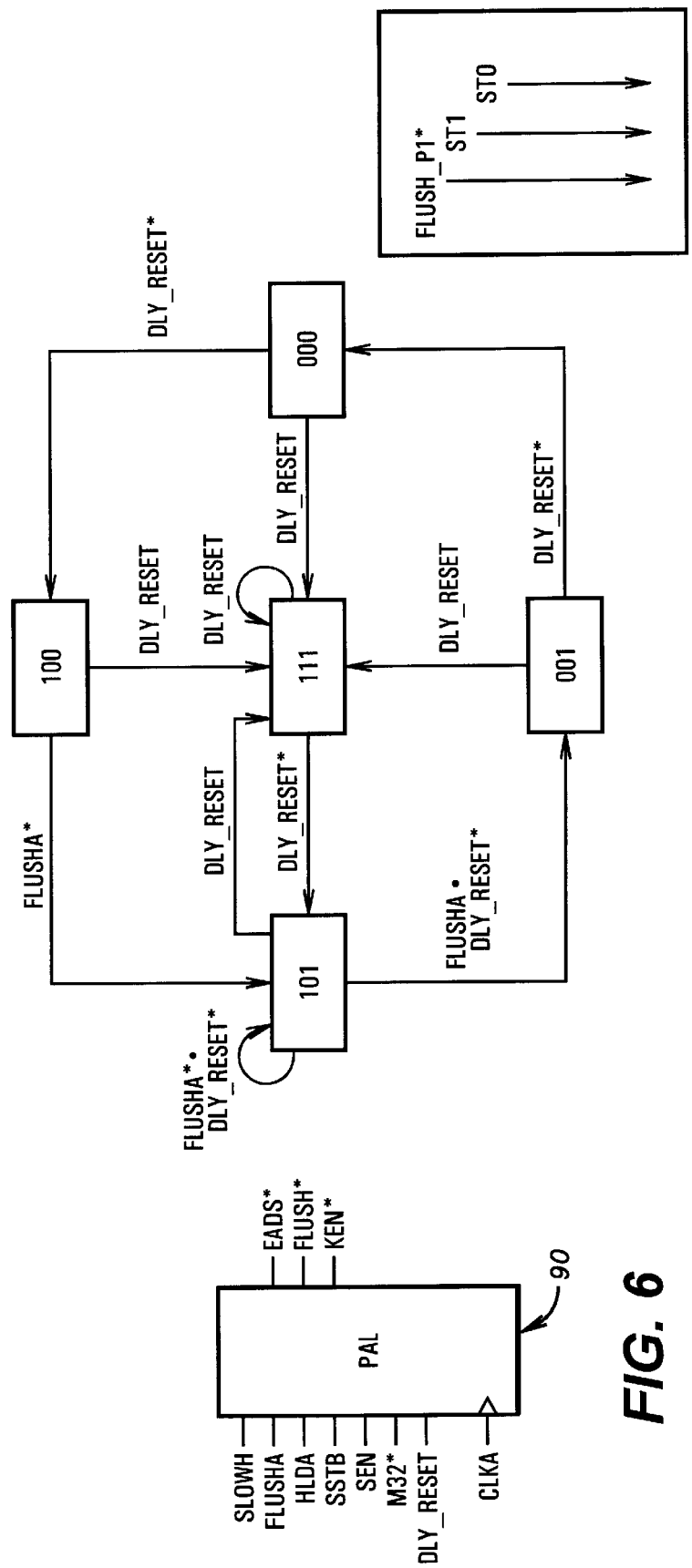
FIGS. 6, 8, 9, 11, 12, 13, 16 and 17 are schematic diagrams illustrating portions of the circuitry of the Fault Tolerance Detection board according to the present invention.
FIGS. 7, 10, 14 15, 18, and 19 are state diagrams of the operation of portions of the circuitry of FIGS. 6, 8, 9, 11, 12, 13, 16, and 17.

Referring now to FIG. 6, a programmable array logic (PAL) device 90 which generates the EADS*, FLUSH*, and the KEN* signals to facilitate operation of the internal cache of the 80486 processor is shown. The PAL 90 is located in the block circuit 39 on the FTD board 20 and provides the EADS*, FLUSH*, and KEN* signals to each of the processor modules 30 and 32. The FLUSH* signal generated here is the FLUSH_P1* signal provided to the P1 processor. These signals are ignored by the P2 processor module 32 because the 80386, which serves as the P2 processor in the present embodiment, does not have an internal cache. In an alternate embodiment of the present invention, the P2 processor module 32 includes an 80486 processor, and the above signals are used by the 80486 processor on the P2 processor module 32.

The PAL 90 receives input signals referred to as SLOWH, FLUSHA, HLDA, SSTB, SEN, M32*, and DLY_RESET. The clock input of the PAL 90 receives the CLKA signal. The SLOWH signal is generated by the system C when a slowdown of the processor clock is required for software compatibility reasons, as is standard in IBM-compatible computer systems. The FLUSHA signal is generated by the system C when a flush of the internal cache is required, as during power up or system reset. The HLDA signal is generated by the HOLD logic 38 in response to a HOLD request from the system C. The SSTB signal is generated by the system C to indicate that a device other than a processor on the FTD board 20 is driving data onto the bus 22. The SSTB signal is asserted to indicate that a cache controller within the computer system C should snoop the bus 22 during this time. The snoop enable or SEN signal is asserted by the system C to enable a cache controller present in the system C to snoop the system bus 22. The M32* signal is generated by the system C to indicate that a certain address is a cacheable address. The M32* signal decodes the condition where a 32-bit memory card is being accessed, this memory being deemed cacheable according to the preferred embodiment. Other memory, such as system ROM and VGA memory are preferably deemed non-cacheable according to the preferred embodiment. The DLY_RESET signal is generated by the reset and clock generation logic 37 a delayed amount of time after either of the RESET_P2 or RESET_387 signals is asserted.

The equation for the KEN* signal is:

$$KEN = DLY\_RESET^* \cdot M32 \cdot FLUSHA^*$$

The KEN* signal is asserted low when a cacheable address is presented and a flush or reset condition is not occurring. The KEN* signal is supplied to the P1 processor module 30 and, when asserted, enables the internal cache in the P1 processor when the P1_KEN signal DIP switch is open to assert the P1_KEN signal. The equation for the EADS* signal is:

$$EADS = DLY\_RESET^* \cdot SEN \cdot SSTB \cdot HLDA$$

The EADS* signal is asserted low when the HOLD logic 38 on the FTD board 20 has a acknowledged a HOLD request, a reset condition is not occurring, and the system C has enabled snooping and has requested that the respective cache controller in the system snoop the bus.

Referring now to FIG. 7, a state diagram which illustrates the generation of the FLUSH_P1* signal is shown. The bits comprising the states in the state machine represent, from left to right, the FLUSH_P1* signal and two internal state signals referred to as ST1 and ST0. State transactions take place on the rising edge of the CLKA signal. The state machine begins in state 111, and all states lead to this state when the DLY_RESET signal is asserted. The state machine progresses from state 111 to state 101 when the DLY_RESET signal is negated. The state machine progresses from state 101 to state 001 when the FLUSHA signal is asserted and the DLY_RESET is negated. In state 001, the FLUSH_P1* signal is asserted low. If the DLY_RESET signal is still negated, then the state machine advances to state 000. If the DLY_RESET signal remains negated, the state machine advances to state 100, where the FLUSH_P1* signal is negated high. If the FLUSHA signal is negated low, then the state machine progresses to state 101. If the FLUSHA signal is negated and the DLY_RESET signal is negated, the state machine stays in state 101.

Figure 8:
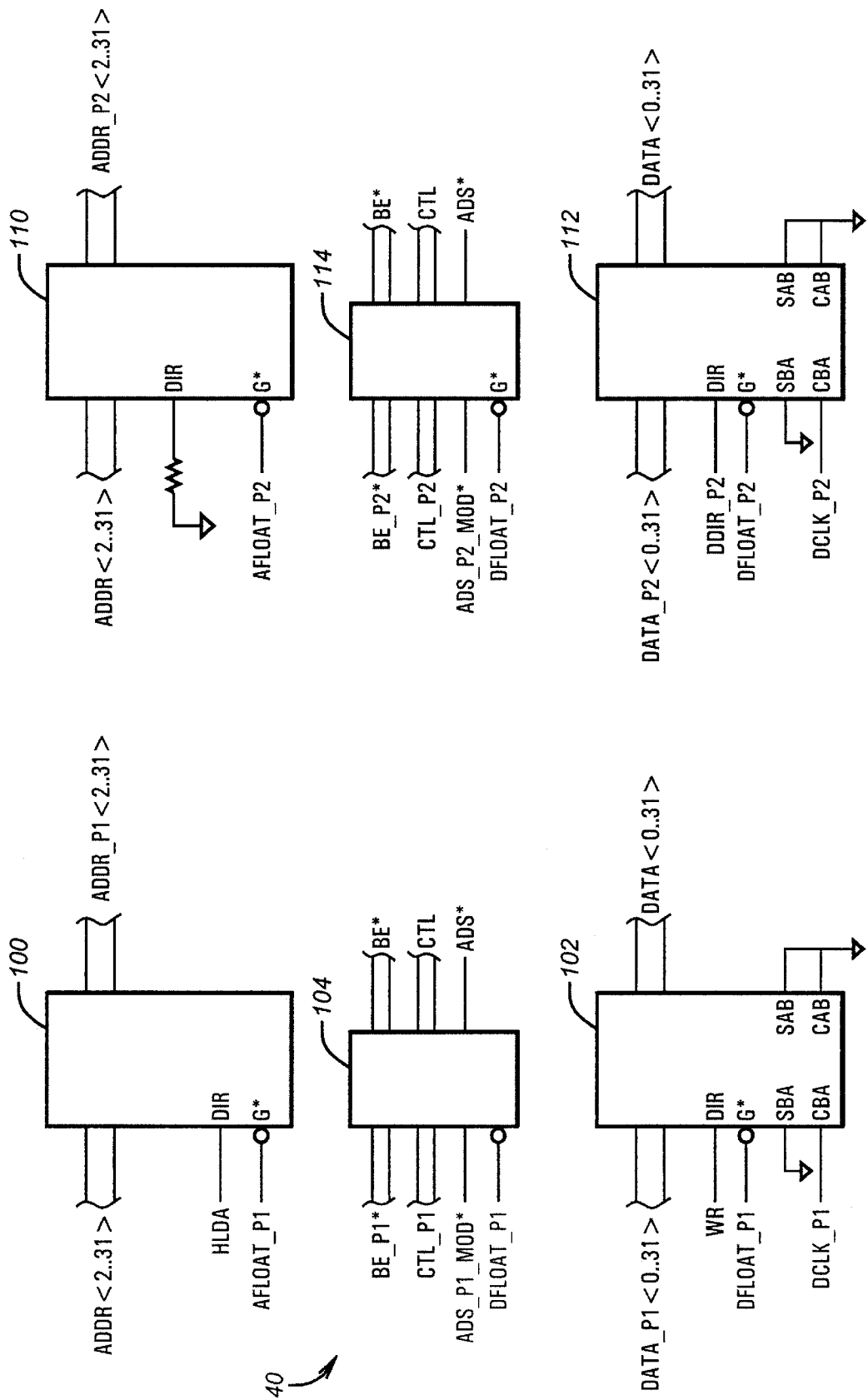

Referring now to FIG. 8, the address, data, and control signals from the P1 and P2 microprocessors are coupled with the corresponding signals from the system bus 22 through a series of transceivers and buffers in the signal multiplexing logic 40. These transceivers and buffers are enabled so that only one microprocessor is driving the system bus 22 at any one time. System bus address signals referred to as ADDR<2 . . . 31>, which comprise the system bus address bus 47, are coupled to the inputs of a 30-bit bi-directional transceiver 100. The ADDR_P1<2 . . . 31> signals are connected to the other inputs of the bi-directional transceiver 100. The directional input of the transceiver 100 receives the HLDA signal from the HOLD logic 38. Therefore, when the HOLD logic 38 has not acknowledged a HOLD request from the system C, then the signal transfer direction is from the P1 processor bus to the system bus 22. When the HOLD logic 38 has acknowledged a HOLD request from the system C, then the direction of signal transfer is from the system bus 22 to the P1 processor, thereby allowing the P1 processor to receive address signals from the system bus 22 for snooping purposes and during cache invalidation cycles.

A signal referred to as AFLOAT_P1 is connected to the inverted gating input of the transceiver 100. The AFLOAT_P1 signal is generated by the P1 processor control logic 34 and is asserted high to disable the transceiver 100 and effectively float the P1 processor address pins. The AFLOAT_P1 signal is asserted high when the P2 processor is in control of the system bus 22, and the AHOLD request signal to the P1 processor is negated. When the AFLOAT_P1 signal is negated low, then signal transfer is enabled between the P1 processor and the system bus 22. When the AFLOAT_P1 signal is low and the HLDA signal is negated, then the ADDR_P1<2 . . . 31> signals are the address signals provided to the system bus 22. When the internal cache of the P1 processor is enabled, the AFLOAT_P1 signal is low, and the HLDA signal is asserted, then the address pins of the P1 processor receive the address signals on the system bus 22 to enable the internal cache of the P1 processor to snoop the system address bus 47 or receive addresses during cache invalidation cycles.

The DATA_P1<0 . . . 31> signals comprising the P1 data bus 42 are connected to the inputs of a 32 bit bi-directional transceiver/register 102. The transceiver/register 102 is preferably comprised of TTL 74LS646 octal bus transceivers and registers according to the preferred embodiment. System bus data signals referred to as DATA<0 . . . 31>, which comprise the system data bus 48, are coupled to the other inputs of the transceiver/register 102. The WR signal from the CTL_P1 signals is connected to the directional input of the transceiver 102. A signal referred to as DFLOAT_P1 is connected to the inverted gating input of the transceiver 100. The DFLOAT_P1 signal is generated by the P1 processor control logic 34 and is asserted high when either the P2 processor is in control of the system bus 22 or the HOLD logic 38 on the FTD board 20 has acknowledged a HOLD request. Therefore, the DFLOAT_P1 signal decodes the condition where the P1 processor data signals should be floated to the system bus 22, and the asserted DFLOAT_P1 signal disables the transceiver/register 102, thereby effectively floating the 80486 data signals to the system bus 22. When the DFLOAT_P1 signal is negated low, enabling the transceiver/register 102, and the P1 processor is performing a write operation, then the direction of the data flow is from the P1 processor to the system bus 22. When the DFLOAT_P1 signal is negated and the P1 processor is performing a read operation, the data flow is from the system bus 22 to the P1 processor. The SAB, SBA and CAB inputs of the transceiver/register 102 are preferably tied to logic low values, and therefore the transceiver/register 102 behaves essentially like a two-way register. In an alternate embodiment of the invention, the SBA input receives a clock disable signal referred to as SBA_P1, which is generated by the P1 processor control logic 34. In this alternate embodiment, when the SBA_P1 signal is asserted, the transceiver/register 102 behaves like a transceiver, and when the SBA_P1 signal is negated, the transceiver/register 102 behaves like a two-way register. The CBA input receives a signal referred to as DCLK_P1.

Figure 11:
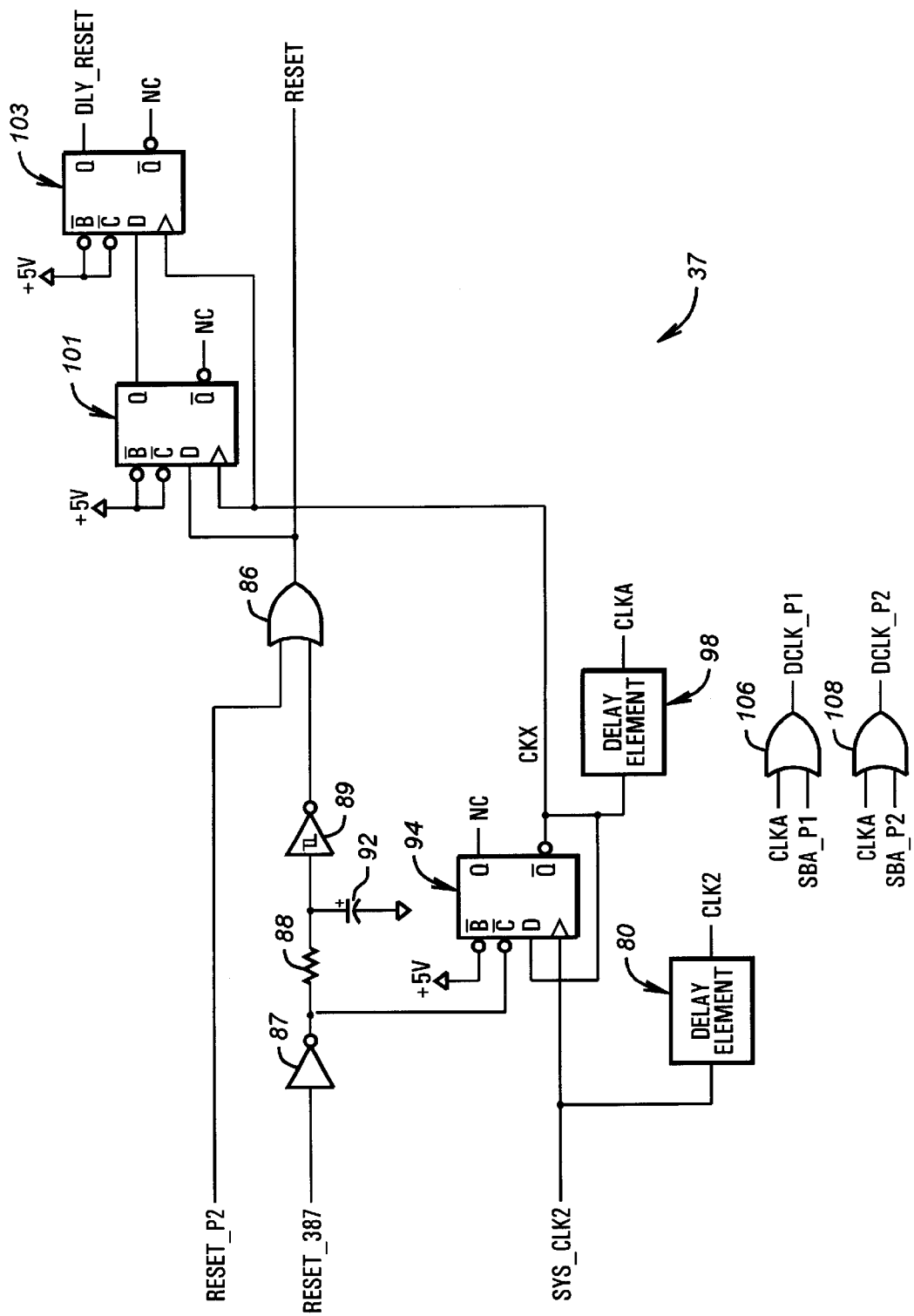

The DCLK_P1 signal is generated by the reset and clock generation logic 37. As shown in FIG. 11, the CLKA signal and the SBA_P1 signal are connected to the inputs of a two input OR gate 106 whose output is the DCLK_P1 signal. When the SBA_P1 signal is negated low, the DCLK_P1 signal behaves like a clock, and the transceiver/register 102 continuously latches data on a respective side and presents this data on the opposite side, depending on the WR signal. When the SBA_P1 signal is asserted high, the DCLK_P1 signal is a logic high value, and the transceiver/register 102 maintains the data it last received until the SBA_P1 signal is negated and the DCLK_P1 signal returns to behaving like a clock. In the preferred embodiment, the DCLK_P1 signal is a logic high value to latch and preserve data from the P1 processor or the system bus 22 when the system ready signal RDY* is asserted at the end of a cycle.

The BE_P1* signals, a signal referred to as ADS P1_MOD* generated by the P1 processor control logic 34, and the CTL_P2 signals are connected to the inputs of a buffer 104. The ADS_P1_MOD* signal is a trapped version of the ADS_P1* signal generated by the P1 processor. The corresponding outputs of the buffer 104 are coupled to the system bus byte enable signals, referred to as the BE* signals, the system bus address strobe signal, referred to as the ADS* signal, and the system bus control signals WR, MIO, and DC, referred to collectively as the CTL signals. The DFLOAT_P1 signal is connected to the inverted gating input of the buffer 104. Therefore, when the P1 processor is in control of the system bus 22 and the HOLD logic 38 has not acknowledged a HOLD request, then the BE_P1* signals, the ADS_P1_MOD* signal, and the CTL_P2 signals are enabled as the respective signals provided to the system bus 22.

Referring again to FIG. 8, the ADDR_P2<2 . . . 31> signals are connected to the inputs of a bi-directional transceiver 110. The ADDR<2 . . . 31> signals are connected to the other inputs of the transceiver 110. The directional input of the transceiver 110 is preferably tied to a logic low value because the P2 processor in the preferred embodiment is an 80386 processor, which lacks an internal cache. Therefore, since the P2 processor will never need to snoop the system bus 22 in the preferred embodiment, the directional input is tied low. A signal referred to as AFLOAT_P2 generated by the P2 processor control logic 35 is connected to the inverted gating input of the buffer 110. The AFLOAT_P2 signal is asserted high when the P2 processor does not have control of the system bus 22 or the HOLD logic 38 has acknowledged a HOLD request from the computer system C. Therefore, the AFLOAT_P2 signal decodes the condition where the P2 processor should have its address pins floated. When the AFLOAT_P2 signal is negated low, then the ADDR_P2<2 . . . 31> signals are enabled as the address signals provided to the system bus 22.

The DATA_P2<0 . . . 31> signals are connected to the inputs of a 32 bit bi-directional transceiver/register 112. The transceiver/register 112 is similar to the transceiver/register 102. The DATA<0 . . . 31> signals are connected to the data inputs of the transceiver/register 112. A signal referred to as DDIR_P2, generated by the P2 processor control logic 35, is connected to the directional input of the transceiver/register 112. In the preferred embodiment, the DDIR_P2 signal is the WR signal generated by the P2 processor. A signal referred to as DFLOAT_P2 is connected to the inverted gating input of the transceiver/register 112. The DFLOAT_P2 signal is generated by the P2 processor control logic 35 and is asserted high during either coprocessor read cycles, or when the P2 processor is not in control of the system bus 22, or when the HOLD logic 38 on the FTD board 20 has acknowledged a HOLD request. Therefore, the DFLOAT_P2 signal decodes the condition where the P2 processor data signals should be floated to the system bus 22, and the asserted DFLOAT_P2 signal disables the transceiver/register 112, thereby effectively floating the data signals generated by the P2 processor. When the DFLOAT_P2 signal is negated low, enabling the transceiver/register 112, and the P2 processor is performing a write operation, then the direction of the data flow is from the P2 processor to the system bus 22. When the DFLOAT_P2 signal is negated and the P2 processor is performing a read operation, the data flow is from the system bus 22 to the P2 processor. It should be noted that when the P2 processor begins a write cycle, and the P1 processor is enabled, control of the system bus 22 passes to the P1 processor, and the DFLOAT_P2 signal is asserted. Therefore, the DATA_P2<0 . . . 31> signals are never propagated to the system bus 22 when the P1 processor is enabled. The SAB, SBA and CAB inputs of the transceiver/register 112 are tied to logic low values, and therefore the transceiver/register behaves essentially like a two-way register. In another embodiment of the invention, the SBA input receives a clock disable signal referred to as SBA_P2, which is generated by the P2 processor control logic 35. The CBA input receives a signal referred to as DCLK_P2.

The DCLK_P2 signal is generated by the reset and clock generation logic 37. As shown in FIG. 11, the CLKA signal and the SBA_P2 signal are connected to the inputs of a two-input OR gate 108 whose output is the DCLK_P2 signal. Therefore, when the SBA_P2 signal is negated low, the DCLK_P2 signal behaves like a clock, and the transceiver/register 112 continuously latches data on a respective side and presents this data on the opposite side, depending on the DDIR_P2 signal. When the SBA_P2 signal is asserted high, the DCLK_P2 signal is a logic high value, and the transceiver/register 112 maintains the last data it received until the SBA_P2 signal is negated and the DCLK_P2 signal returns to behaving like a clock. In the preferred embodiment, the SBA_P2 signal is asserted high to preserve the data received by the P1 processor on the system bus 22 when the system ready signal RDY* is asserted at the end of a P1 processor I/O read cycle.

The preserving function of the transceiver/register 112 is used in situations where the P1 processor has performed a read cycle to an address that can return different data when read at different times, defined as an I/O data read. The preserving function of the transceiver/register 112 allows the P2 processor to receive the same data for these I/O read cycles that the P1 processor received for the equivalent cycle. The DCLK_P2 signal behaves like a clock while the P2 processor is performing memory read (MR) cycles to allow the P2 processor to receive its data from the system bus 22. The DCLK_P2 signal is asserted high by the P2 processor control logic 35 when there is an address signal match on a non-memory read (NMR) cycle run by the P1 processor in order to prevent the transceiver/register 112 from latching any more data from the system bus 22. This preserves the data received or generated by the P1 processor during its NMR cycle.

When the P1 processor begins an NMR write cycle, it outputs the respective data on its data pins. However, the P1 processor control logic 34 does not assert the respective address strobe signal, so therefore the data remains sitting on the P1 processor's data pins. Control of the system bus 22 then passes to the P2 processor, which catches up to the P1 processor, performs the same NMR write cycle, and outputs the respective data on its data pins. At this time, the data on the data pins of the P1 and P2 processors is compared. Also, the DFLOAT_P2 signal is asserted to float the outputs of the transceiver/register 112 at this time, and the data stored in the transceiver/register 112 is ignored.

When the P1 processor begins an NMR I/O data read cycle, it begins the NMR cycle but does not receive the requested I/O data before control of the system bus 22 passes to the P2 processor. The P2 processor performs the appropriate instructions to catch up to the P1 processor and then begins the NMR I/O read cycle previously begun by the P1 processor. However, before the P2 processor can execute the I/O read instruction, control of the system bus 22 passes back to the P1 processor, which then executes the I/O read instruction. The transceiver/register 112 latches the data received by the P1 processor, and the SBA_P2 signal is asserted high to force the DCLK_P2 signal to a logic high value in order to preserve this data. This ensures that the P2 processor receives the same data received by the P1 processor when the P2 processor performs the equivalent I/O data read cycle. When the next NMR cycle occurs, the P2 processor control logic 35 terminates the P2 processor pending cycle by generating the READY_P2* signal to the P2 processor. The P2 processor completes the I/O read cycle previously executed by the P1 processor and receives as its data the data stored in the transceiver/register 112.

A signal referred to as ADS_P2_MOD*, the CTL_P2 signals, and the BE_P2* signals are connected to the inputs of a buffer 114. The ADS_P2_MOD* signal is a trapped version of the ADS_P2* signal that is provided from the P2 processor control logic 35 to the system bus 22. The corresponding outputs of the buffer 114 are coupled to the system bus ADS* signal, the system bus control CTL signals MIO, WR, and DC, and the system bus byte enable or BE* signals. The DFLOAT_P2 signal is connected to the inverted gating input of the buffer 114. Therefore, when the P2 processor is in control of the system bus 22 and is performing a read operation, then the ADS_P2_MOD* signal, the CTL_P2 signals, and the BE_P2* signals are enabled as the signals provided to the system bus 22.

Figures 9, 10:
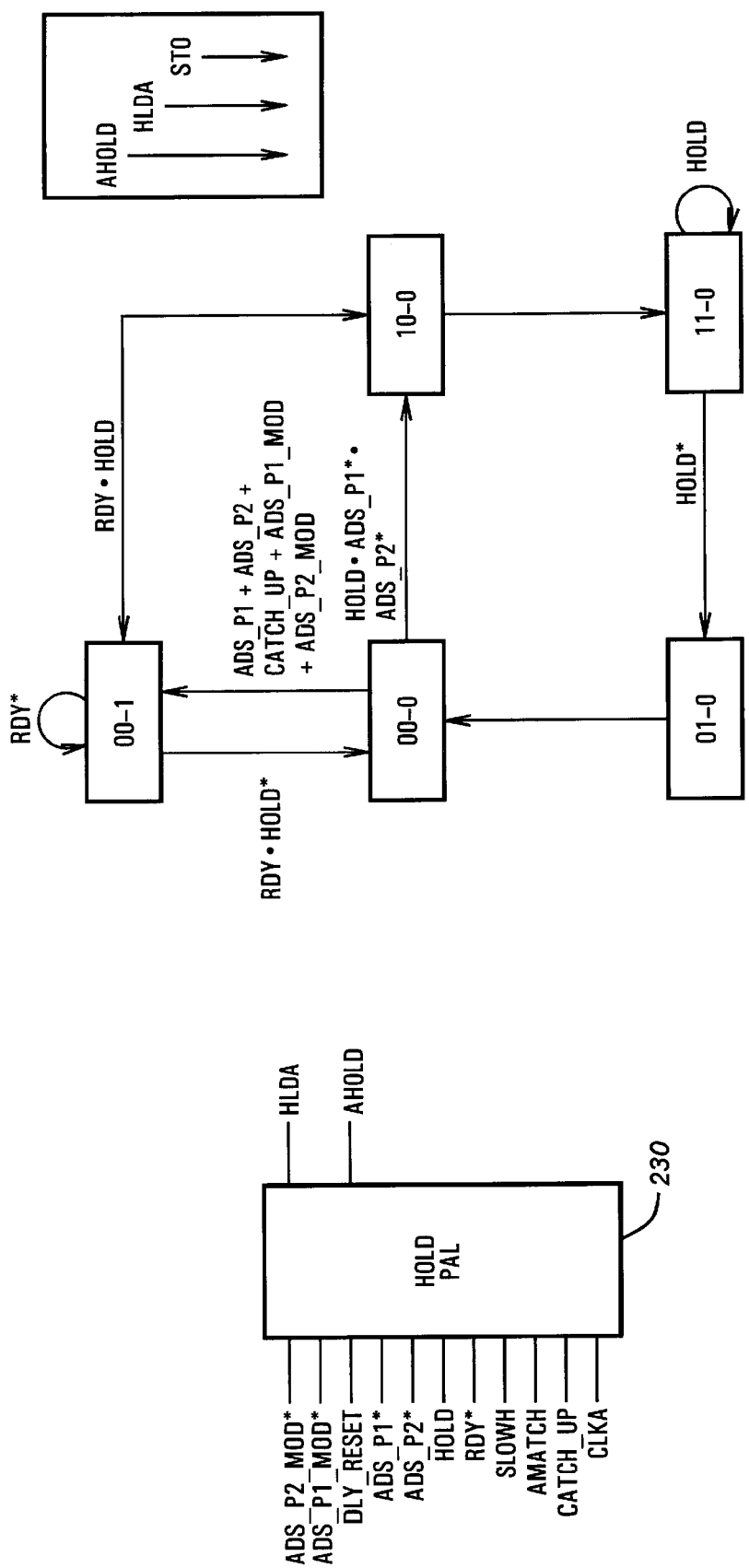

Referring now to FIG. 9, the HOLD logic 38 receives HOLD requests from the computer system C and generates a hold acknowledge back to the computer system C according to the present invention. The HOLD logic 38 is implemented in a programmable array logic (PAL) device referred to as the HOLD PAL 230. The HOLD PAL 230 receives the ADS_P2_MOD* signal, the ADS_P1_MOD* signal, the DLY_RESET signal, the ADS_P1* signal, the ADS_P2* signal, the system bus HOLD request signal, the system bus ready signal RDY*, the SLOWH signal, a signal referred to as AMATCH, and a signal referred to as CATCH_UP. The AMATCH signal is generated by the error detection logic 40 and is asserted when an address signal match occurs between the P1 and P2 processors on an NMR cycle. The CATCH_UP signal is generated by the P2 processor control logic 35 and is asserted when the P2 processor begins an NMR cycle. The CLKA signal is connected to the clock input of the HOLD PAL 230. The HOLD PAL 230 generates the AHOLD signal, the HLDA signal, and an internal state signal referred to as ST0.

System HOLD requests from the computer system C never reach the two processors according to the preferred embodiment of the present invention, but instead are provided to the HOLD PAL 230. The hold acknowledge or HLDA signal that is output back to the computer system C is generated by the HLDA PAL 230. Therefore, HOLD cycles are never executed by either of the processors even though they occur frequently. The P1 and P2 processors are never put on HOLD in the present invention because, due to their internal differences, the processors may respond to the HOLD signal at different times and hence get out of synchrony. The HOLD PAL 230 traps the HOLD request signals generated by the computer system C and provides the control logic 34 and 35 for each of the processors with the HLDA signal. The AHOLD signal is asserted one CLKA signal cycle before the HLDA signal is asserted to enable cache invalidation cycles on the 80486 P1 processor.

Referring now to FIG. 10, a state diagram illustrating the operation of the HOLD PAL 230 is shown. State transitions in this state machine take place on the rising edge of the CLKA signal. Each state of the state machine comprises three values representing the status of the outputs of the HOLD PAL 230. The two left-most values represent the status of the AHOLD signal and the HLDA signal, respectively, and the right-most value represents the status of the ST0 value. The initial or rest state of the state machine is state 00-0, and all states lead to this state when the DLY_RESET signal is asserted.

The state machine progresses from state 00-0 to state 00-1 when either of the P1 or P2 processors have generated their address strobe signals or have begun a bus cycle, signified by the condition:

ADS_P1+ADS_P2+CATCH_UP+ADS_P1_MOD+ ADS_P2 MOD

In state 00-1, the ST0 signal is asserted high. The asserted ADS_P1* or ADS_P2* signals act as a warning to the HOLD logic 38 that the P1 or P2 processor, respectively, is about to gain control of the system bus 22 and begin a bus cycle. The state machine remains in state 00-1 if one of the respective processors is in control of the system bus 22 and is performing a cycle, signified by the RDY* signal being negated. If the HOLD PAL 230 has not received a system bus HOLD request by the time that the respective processor in control of the system bus 22 completes its cycle, signified by the condition:

RDY·HOLD then the state machine returns to state 00-0.

If the HOLD logic receives a HOLD request before the respective processor completes its cycle, then the state machine progresses from state 00-1 to state 10-0 when the respective processor completes its current cycle. The condition for this progression is:

RDY·HOLD

The AHOLD signal is asserted to the P1 processor in state 10-0, enabling cache invalidation cycles during the upcoming HLDA cycle.

The state machine also advances from its initial or rest state 00-0 to state 10-0 when the following condition is true:

HOLD·ADS_P1*·ADS_P2*

The HOLD PAL 230 can immediately acknowledge a HOLD request if the ADS_P1* and ADS_P2* signals are both negated in state 00-0, meaning that the P1 and P2 processors have not begun an ADS* cycle.

The state machine progresses from state 10-0 to state 11-0 on the next CLKA signal cycle, and the HLDA signal is asserted. The asserted hold acknowledge signal signifies that the P1 and P2 processors do not have control of the system bus 22. The P1 processor and P2 processor control logic 34 and 35 do not allow a cycle begun by their respective processors to propagate to the system bus 22 while the HLDA signal is asserted. The state machine remains in state 11-0 while the HOLD request is active, and the HLDA signal remains asserted during this time. The state machine progresses to state 01-0 when the HOLD request is negated, and the AHOLD signal is negated in this state. The state machine then progresses to its initial state 00-0 on the next CLKA signal cycle, and the HLDA signal is negated in this state.

Referring now to FIG. 11, the reset signal and clock generation circuitry 37 according to the present invention is shown. The flip-flops used in this circuit are D-type positive edge triggered flip-flops with preset and clear inputs. A clocking signal generated on the FTD board 20 referred to as SYS_CLK2 is connected through a delay element 80 to form the system bus clocking signal CLK2. The SYS_CLK2 signal preferably has a frequency of 40 MHz, as does the CLK2 signal. The RESET_P2 signal is connected to the input of a two input OR gate 86. The RESET_387 signal is connected to the input of an inverter 87 whose output is connected through a resistor 88 to the input of a hysteresis inverter 89. The output of the inverter 89 is connected to an input of the two input OR gate 86. A capacitor 92 is connected between the input of the inverter 89 and a logic low value. The capacitor 92 provides a delay to the RESET_387 signal supplied to the OR gate 86 because the RESET_387 signal is asserted approximately 30 SYS_CLK2 signal cycles before the RESET_P2 signal. The RESET_387 signal is asserted before the RESET_P2 signal so that the output pins of the 80387 are stable when the P2 processor is being initialized. This is necessary because the P2 processor reads the status of the FPERR_P2* signal during its initialization to determine whether an 80387 or 80287 numeric coprocessor is installed in the computer system C. The output of the OR gate 86 is the RESET signal.

The output of the invertor 87 is also connected to the inverted clear input of a D-type flip-flop 94. The inverted preset input of the flip-flop 94 is connected to a logic high value. The SYS_CLK2 signal is connected to the clocking input of the flip-flop 94. The inverted Q output of the flip-flop 94 is a signal referred to as CKX, which is connected to the D input of the flip-flop 94. Therefore, the CKX signal has a frequency that is one half that of the SYS_CLK2 signal. The CKX signal is also connected to a delay element 98, which provides a delay equal to the delay provided by the delay element 80. The output of the delay element 98 is the CLKA signal. The CLKA signal is in phase with the CLK2 signal and has a frequency of 20 Mhz, which is one half of the frequency of the CLK2 signal.

The RESET signal is connected to the D input of a D-type flip-flop 101. The inverted preset and clear inputs of the flip-flop 101 are connected to a logic high value. The CKX signal is connected to the clock input of the flip-flop 101. The Q output of the flip-flop 101 is connected to the D input of a D-type flip-flop 103. The inverted preset and clear inputs of the flip-flop 103 are connected to a logic high value. The CKX signal is connected to the clock input of the flip-flop 103. The Q output of the flip-flop 103 is the DLY_RESET signal. The DLY_RESET signal is therefore asserted two CKX signal cycles after the RESET signal has been negated to guarantee that the A20M* input of the P1 processor is a logic high value during this time.

Referring again to FIG. 11, the CLKA signal and the SBA_P1 signal are connected to the inputs of a two input OR gate 106, whose output is the DCLK_P1 signal. The CLKA signal and SBA_P2 signal are connected to the inputs of a two input OR gate 108, whose output is the DCLK_P2 signal. As previously explained, the SBA_P1 and SBA_P2 signals are asserted high by the P1 and P2 processor control logic 34 and 35 to disable the latching ability of the transceiver/registers 102 and 112.

Figure 12:
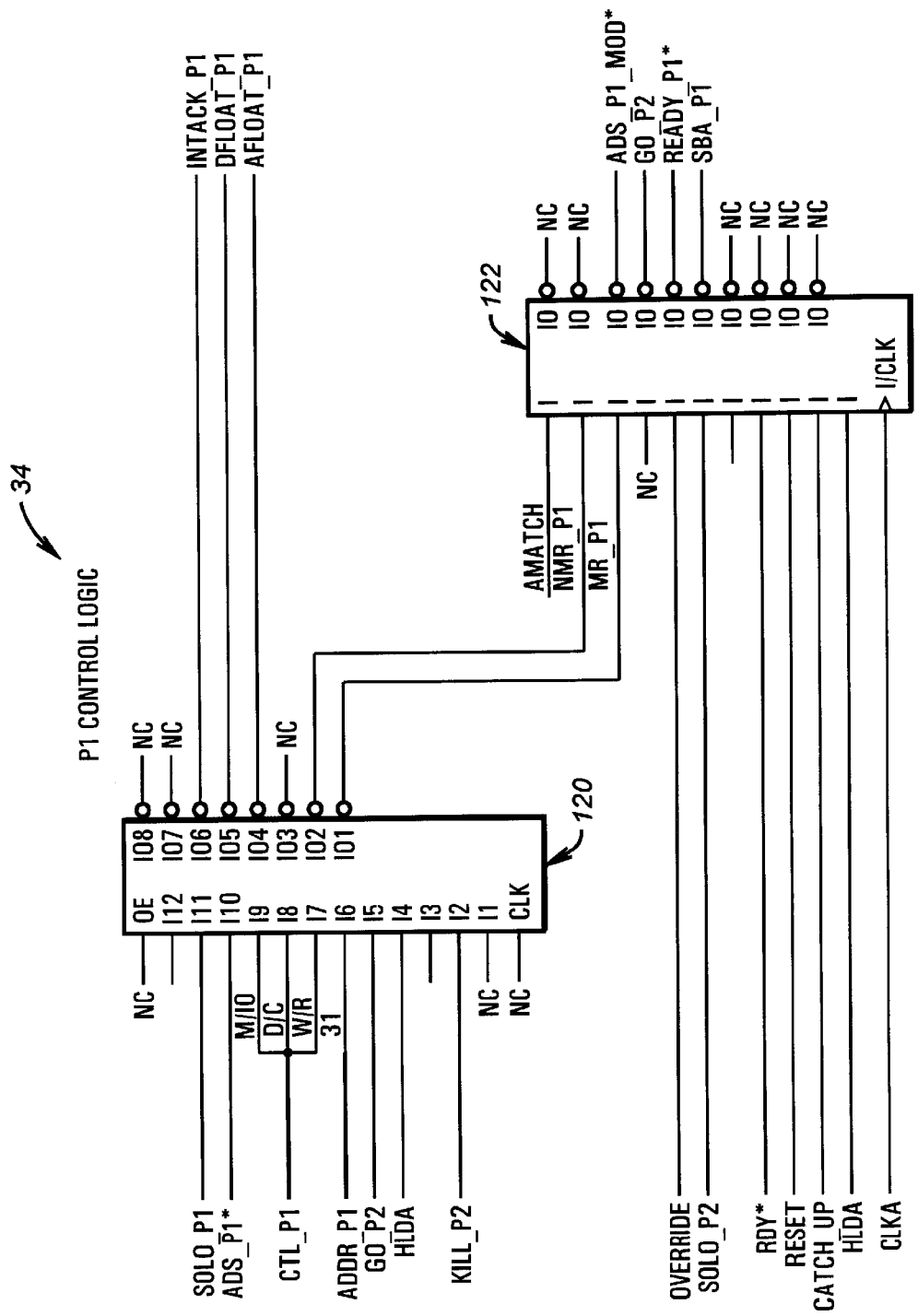
Figure 13:
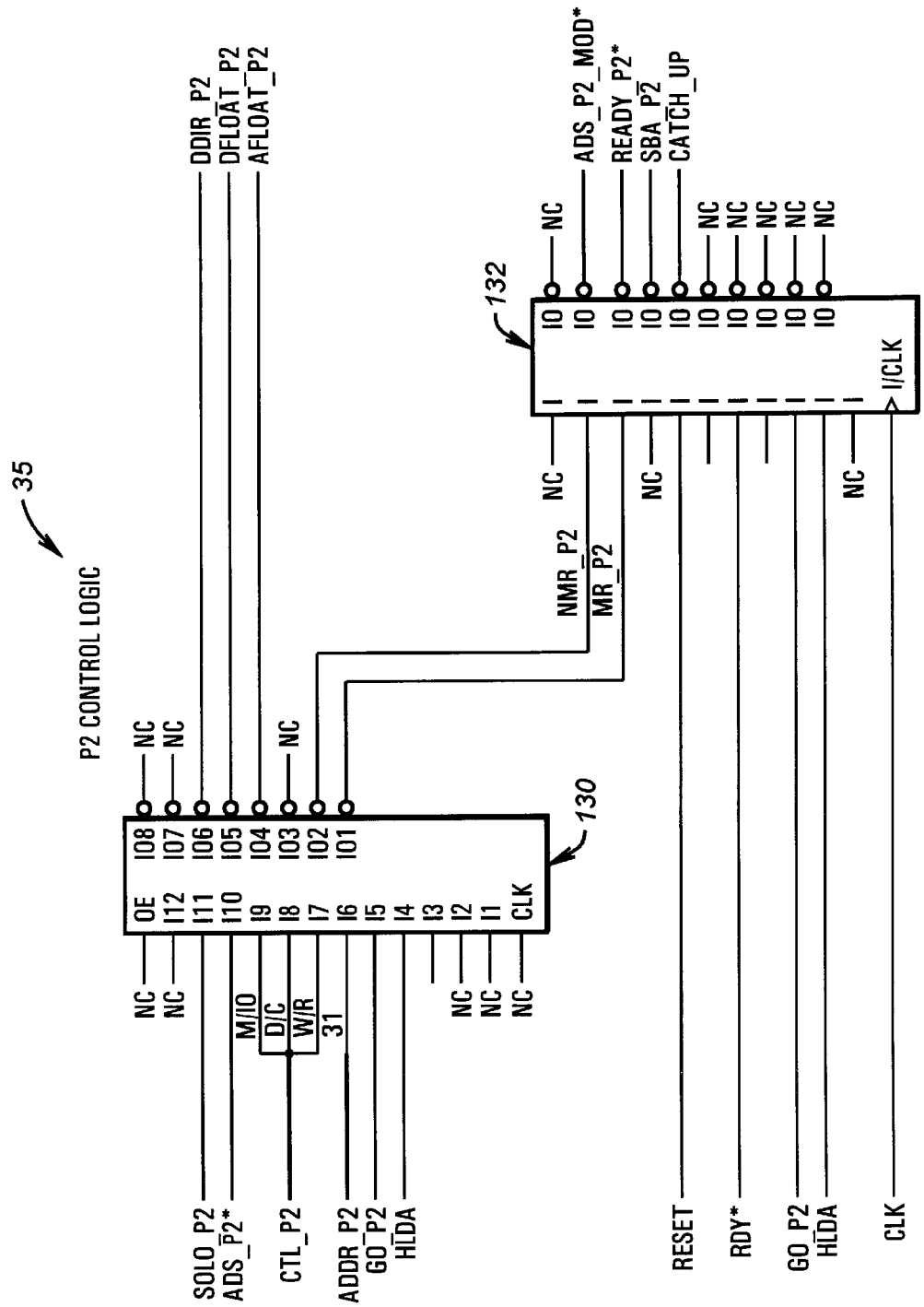

Referring now to FIGS. 12 and 13, the P1 processor control logic 34 and P2 processor control logic 35 which control the operation of the P1 and P2 processors, respectively, according to the present invention are shown. The control logic 34 and 35 for each respective processor controls its respective processor's access to the system bus 22 by trapping the processor's address strobe signal and generating a bus address strobe signal to the system bus 22 when the respective processor has control of the bus. The control logic 34 and 35 for each respective processor 31 and 33 also traps the system bus RDY* signal from the system bus 22 and generates a processor READY signal to the respective processor to enable the processor to begin another cycle when that processor has control of the bus. In this manner, each of the processors thinks that it is continually performing bus cycles, but only one processor actually has control of the system bus 22 at any one time.

Referring now to FIG. 12, the P1 processor control logic 34 comprises two programmable array logic (PAL) devices 120 and 122. The SOLO_P1 signal, the ADS_P1* signal, the CTL_P1 signals, the ADDR_P1<31 > signal, a signal referred to as GO_P2, the HLDA signal, and a signal referred to as KILL_P2 are connected to the inputs of the PAL 120. The GO_P2 signal is asserted low by the P1 processor control logic 34 to transfer control of the system bus 22 to the P2 processor. The KILL_P2 signal is asserted during an interrupt acknowledge cycle performed by the P1 processor to disable the P2 processor. The KILL_P2 signal is also asserted by the internal difference logic 36 when internal differences or incompatibilities between the 80386 and 80486 processors have caused them to execute instructions differently in a way such that the internal difference logic 36 cannot recover. When this occurs, the KILL_P2 signal is asserted to disable the P2 processor and the error detection circuitry until a hardware interrupt occurs, at which time the processors can be resynchronized. The PAL 120 generates the DFLOAT_P1 signal, the AFLOAT_P1 signal, and an interrupt acknowledge signal referred to as INTACK_P1. The PAL 120 also generates signals referred to as NMR_P1 and MR_P1.

The DFLOAT_P1 signal is asserted high to disable the data transceiver/register 100 and the buffer 104, thereby effectively floating the data pins of the P1 processor as well as the BE_P1* signals, the ADS_P1_MOD* signal, and the CTL_P2 signals. The DFLOAT_P1 signal is asserted when the P2 processor is in control of the system bus 22 or the HOLD logic 38 has acknowledged a HOLD request. The equation for the DFLOAT_P1 signal is:

DFLOAT_P1=GO_P2+HLDA

The AFLOAT_P1 signal is asserted high to disable the address transceiver 100, thereby effectively floating the address pins of the P1 processor. The AFLOAT_P1 signal is asserted when the P2 processor is in control of the system bus 22 and the AHOLD signal is negated. The equation for the AFLOAT_P1 signal is:

AFLOAT_P1=GO_P2·AHOLD*

The INTACK_P1 signal is asserted to terminate the P2 processor when the P1 processor has received an interrupt request and has responded with an interrupt acknowledge or INTACK cycle. The equation for the INTACK signal is:

INTACK_P1=ADS P1·MIO*·DC*·WR*

The INTACK_P1 signal decodes an interrupt acknowledge cycle performed by the P1 processor. The INTACK_P1 signal disables both the P2 processor and the error detection logic 40, as is explained further below.

The MR_P1 signal is asserted to classify all P1 processor memory read and INTACK cycles as memory read or MR cycles. If the KILL_P2 signal or the SOLO_P1 signal is asserted during a bus cycle, then that cycle is also classified as a memory read cycle. Therefore, the effect of either of the KILL_P2 or SOLO_P1 signals is to classify all P1 processor cycles as MR cycles. Since control of the system bus 22 only passes to the P2 processor when the P1 processor begins an NMR cycle, this effectively disables operation of the P2 processor. The equation for the MR_P1 signal is:

MR_P1=ADS_P1·MIO·WR*+ADS_P1·MIO*·* DC*·* WR*+ADS_P1·(KILL_P2+SOLO_P1)

The NMR_P1 signal is asserted during bus cycles that are not classified as memory read cycles or INTACK cycles. The equation for the NMR_P1 signal is:

NMR_P1=ADS P1·KILL_P2*·SOLO_P1*·(WR+MIO*·DC)

The NMR_P1 signal is asserted during all P1 processor write cycles and P1 processor I/O data cycles when the KILL_P2 signal and the SOLO_P1 signal are also negated. The asserted NMR_P1 signal classifies a P1 processor cycle as an NMR cycle. The asserted KILL_P2 or SOLO_P1 signal prevent a P1 processor bus cycle from being classified as an NMR cycle, thereby preventing the P2 processor from gaining access to the system bus 22 and effectively disabling the P2 processor.

The PAL 122 receives as inputs the NMR_P1 signal and the MR_P1 signal from the PAL 120 as well as a signal referred to as OVERRIDE, the SOLO_P2 signal, the RDY* signal, the RESET signal, the CATCH_UP signal, the HLDA signal, and the AMATCH signal generated by the error detection logic 40. The CLKA signal is connected to the clock input of the PAL 122. The OVERRIDE signal is asserted by the internal difference logic 36 in certain situations where, due to internal differences between the two processors, the P2 processor has been allowed to execute instructions ahead of the P1 processor. As previously discussed, the P2 processor and P1 processor used in the preferred embodiment are non-identical, object code compatible processors which have certain internal differences that cause them to execute certain instructions differently. The internal difference logic 36 accounts for some of these instances and allows the P2 processor to execute instructions ahead of the P1 processor when these instances occur. When the P1 processor regains control of the system bus 22, the OVERRIDE signal is asserted to prevent the P1 processor control logic 34 from transferring control of the system bus 22 back to the P2 processor until the P1 processor is caught up to the P2 processor, as is described further below.

The CATCH_UP signal is generated by the P2 processor control logic 35 and is asserted high when the P2 processor performs an NMR cycle. The asserted CATCH_UP signal signifies, when the OVERRIDE signal is negated, that the P2 processor has caught up to the P1 processor with respect to instruction execution and directs the P1 processor control logic 34 to return control of the system bus 22 to the P1 processor.

The PAL 122 generates the ADS_P1_MOD* signal, the GO_P2 signal, the READY_P1* signal, the SBA_P1 signal, and an internal state signal referred to as ST0. The ADS_P1_MOD* signal is the version of the P1 processor address strobe signal that is provided to the system bus 22. The PAL 122 traps the ADS_P1* signal generated by the P1 processor and determines whether the cycle begun by the P1 processor is an MR cycle or an NMR cycle before asserting the ADS_P1_MOD* signal to the system bus 22. The GO_P2 signal is asserted when the cycle begun by the P1 processor is classified as an NMR cycle, and this signal transfers control of the system bus 22 to the P2 processor.

The READY_P1* signal is coupled to the RDY* input of the P1 processor and is asserted low to enable the P1 processor to begin another cycle. The READY_P1* signal is asserted when the P1 processor is in control of the system bus 22 and the system C has asserted the system RDY* signal, signifying that the previous cycle has been completed. The equation for the READY_P1* signal is:

READY_P1=RDY·GO_P2*

Figure 14:
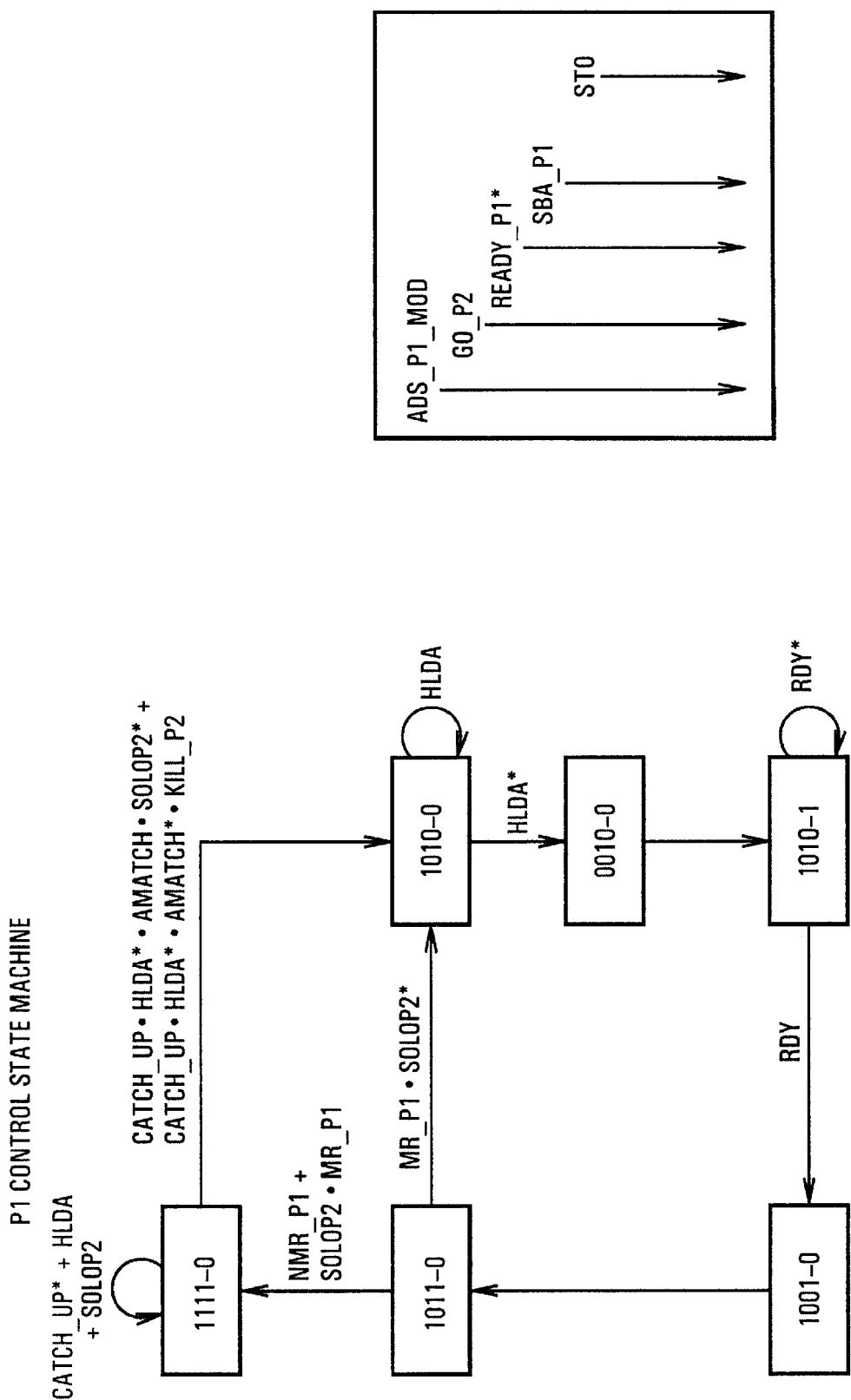

Referring now to FIG. 14, a state diagram which illustrates the operation of the P1 processor control logic 34 implemented in the PAL's 120 and 122 is shown. State transitions take place on the rising edge of the CLKA signal.

The states in the P1 processor state diagram comprise five values representing the status of the output signals ADS_P1_MOD*, GO_P2, READY_P1*, SBA_P1, and ST0. The initial or rest state of the state machine is state 1011-0, and all states in the state machine lead to state 1011-0 on assertion of the system bus RESET signal.

At power up of the computer system C, the P1 and P2 processors are initially synchronized through the system bus RESET signal, and the P1 processor control state machine is placed in its initial state 1011-0. After the RESET, each of the processors generates its respective address strobe signal ADS_P1* or ADS_P2*, which is trapped by their respective control logic 34 and 35. The P1 processor is granted control of the system bus 22 first, and the progression of the state machine from its initial state 1011-0 depends on whether the first cycle is an MR cycle or an NMR cycle. In general, when the state machine is in its initial or rest state, the control logic 34 is waiting for the P1 processor to assert its ADS_P1* signal, which will be trapped by the P1 processor control logic 34 and used to determine whether the forthcoming P1 processor cycle is an MR cycle or an NMR cycle. According to the preferred embodiment, the first processor bus cycle after system initialization is always an MR cycle.

If the upcoming P1 processor cycle is classified as an MR cycle, signified by the MR_P1 signal being true, then the state machine progresses from its initial state to state 1010-0. The SBA_P1 signal is negated low in state 1010-0 to differentiate this state from the previous state and also to enable the latching operation of the transceiver/register 112. The state machine remains in state 1010-0 if the HOLD logic 38 has acknowledged a system HOLD request, signified by the HLDA signal being asserted. The state machine progresses from state 1010-0 to state 0010-0 when the HLDA signal is negated, and the ADS_P1_MOD* signal is asserted to the system bus 22 in state 0010-0.

The asserted ADS_P1_MOD* signal begins a P1 processor bus cycle and effectively grants the P1 processor control of the system bus 22. The state machine progresses from state 0010-0 to state 1010-1 on the next CLKA signal cycle. In this state the ADS_P1_MOD* signal is negated. The state machine remains in this state waiting for the system bus RDY* signal to be asserted, signifying the completion of the bus cycle. When the system RDY* signal is asserted, the state machine advances to state 1001-0, and the PAL 120 asserts the READY_P1* signal to the P1 processor, terminating the present cycle. The state machine then advances from state 1001-0 to its initial state 1011-0, enabling the processor to begin another cycle. In its initial state, the P1 processor asserts the ADS_P1* signal, which is again trapped by the P1 processor control logic 34 and used to determine whether the upcoming cycle should be classified as an MR cycle or an NMR cycle.

If the P1 processor begins an NMR cycle from its initial state, then the state machine progresses to state 1111-0, and the GO_P2 signal is asserted high. The asserted GO_P2 signal grants control of the system bus 22 to the P2 processor. In state 1111-0, the P2 processor executes the instructions previously executed by the P1 processor until it catches up to the pending NMR cycle on the P1 processor. The P2 processor control logic 35 negates the CATCH_UP signal low to maintain the P1 processor state machine in state 1111-0 during the time that the P2 processor is executing cycles to catch up to the P1 processor. The state machine also remains in state 1111-0 when either the HLDA signal is asserted, or if the SOLO_P2 signal is asserted. The asserted SOLO_P2 signal signifies that only the P2 processor is active, and the asserted SOLO_P2 signal maintains the P1 processor state machine in state 1111-0 to render the P1 processor inactive.

The state machine progresses from state 1111-0 to state 1010-0 when the condition:

$$CATCH\_UP \cdot HLDA^* \cdot AMATCH \cdot SOLO\_P2^* + CATCH\_UP \cdot HLDA^* \cdot AMATCH^* \cdot KILL\_P2$$

is true. The first minterm of this condition signifies that the P2 processor has caught up to the P1 processor and has begun the NMR cycle previously begun by the P1 processor before it relinquished control of the bus, the address signals on the pins of the P2 processor match the corresponding signals pending on the P1 processor, the HOLD logic 38 has not acknowledged a HOLD request, and the P1 processor is enabled. The second midterm advances the state machine from state 1111-0 to state 1010-0 when, because of either certain internal differences between the P2 processor and P1 processor which occur in protected mode, or because of inconsistent operation of the two processors, or because of processor incompatibilities, the P2 processor address signals do not match those pending on the P1 processor, resulting in the computer system C locking up. In these situations, the KILL_P2 signal is asserted to advance the state machine from state 1111-0 to state 1010-0 and return control of the system bus 22 to the P1 processor. The asserted KILL_P2 signal causes the P1 processor to take permanent control of the system bus 22, never giving this control back to the P2 processor until a hardware interrupt occurs. As is described further below, interrupt requests, certain paging instructions, and performance of the FSAVE command each assert a respective "kill" signal, and these signals are ORed together to produce the KILL_P2 signal.

In state 1010-0 the GO_P2 signal is negated low, removing the P2 processor from control of the system bus 22. The SBA_P1 signal is negated low in this state, enabling the DATA_P1<0 . . . 31> signals to the system data bus. The state machine then progresses through states 0010-0, 1010-1, and 1001-0 before returning to its initial state, state 1011-0, as previously described.

Referring now to FIG. 13, the P2 processor control logic 35 which controls the operation of the P2 processor according to the present invention is shown. The P2 processor control logic 35 is implemented in two PAL devices 130 and 132. The signals input to the PAL 130 include the SOLO_P2 signal, the ADS_P2* signal, the CTL_P2 signals, which include the MIO, DC, and WR signals generated by the P2 processor, the ADDR_P2<31> signal, the GO_P2 signal, and the HLDA signal. The outputs of the PAL 130 include the DDIR_P2 signal, the AFLOAT_P2 signal, the DFLOAT_P2 signal, and signals referred to as NMR_P2 and MR_P2.

The equation for the AFLOAT_P2 signal is:

$$AFLOAT\_P2 = GO\_P2^* + HLDA$$

The AFLOAT_P2 signal is asserted to disable the P2 processor address signal transceiver 110, thereby effectively floating the P2 processor's address pins. The AFLOAT_P2 signal is asserted when the P2 processor is not in control of the system bus 22 or when the HOLD logic 38 has acknowledged a HOLD request. The equation for the DFLOAT_P2 signal is:

$$DFLOAT\_P2 = GO\_P2^* + HLDA + GO\_P2 \cdot HLDA^* \cdot ADDR\_P2<31> \cdot MIO^* \cdot WR^*$$

The DFLOAT_P2 signal is asserted to disable the transceiver/register 112 as well as the control signal buffer 114, thereby effectively floating the P2 processor's data, control and byte enable pins, as well as the ADS_P2_MOD* signal. The DFLOAT_P2 signal is asserted when the P2 processor is not in control of the system bus 22, or the HOLD logic 38 has acknowledged a HOLD request, or the P2 processor is performing a coprocessor read operation. A coprocessor operation is decoded when I/O accesses with the ADDR_P2<31> signal asserted are detected. The ADDR_P2<31> signal is used to decode P2 processor accesses to one of the I/O addresses reserved for the 80387 numeric coprocessor, either I/O address 800000F8H or 800000FCH.

It should be noted that the GO_P2 signal is negated when the P2 processor begins an NMR cycle, which includes both write cycles and I/O read cycles, and an address signal match occurs between the P1 and P2 processors, thereby asserting the DFLOAT_P2 signal. The asserted DFLOAT_P2 signal disables the transceiver/register 112 and buffer 114 during P2 processor write cycles because these cycles do not propagate to the system bus 22, but are merely used by the error detection logic 40 to compare with the similar data pending on the pins of the P1 processor. The asserted DFLOAT_P2 signal also disables the transceiver/register 112 and buffer 114 when the P2 processor begins an I/O read cycle because these cycles are terminated with the same data that the P1 processor received for its equivalent cycle, as is explained below.

The equation for the MR_P2 signal is:

MR_P2=ADS_P2·SOLO_P2*·MIO·WR*+ADS_P2·SOLO_P2·ADDR_P2<31> *+ADS_P2·SOLO_P2·MIO

The MR_P2 signal is asserted high on all memory read cycles when the P2 processor is enabled. The MR_P2 signal is also asserted during all memory cycles and non-coprocessor cycles when the P2 processor is disabled. The equation for the NMR_P2 signal is:

NMR_P2=ADS_P2·SOLO_P2*·MIO*·(DC*+ADDR_P2<31>*)+ADS_P2·SOLO_P2*·MIO·WR

The NMR_P2 signal is asserted when the P2 processor is enabled and the current P2 processor bus cycle is an I/O code cycle or is an I/O cycle not to the coprocessor. The NMR_P2 signal is also asserted when the P1 processor is enabled and the current P2 cycle is a memory write cycle.

The PAL 132 receives as inputs the NMR_P2 signal, the MR_P2 signal, the RESET signal, the RDY* signal, the GO_P2 signal, and the HLDA signal. The CLKA signal is connected to the clock input of the PAL 132. The outputs of the PAL 132 include the ADS_P2_MOD* signal, the READY_P2* signal, the SBA_P2 signal, the CATCH_UP signal, and two internal state values referred to as ST1 and ST0. The ADS_P2_MOD* signal is the P2 processor address strobe signal that is provided to the system bus 22. The PAL 132 traps the ADS_P2* signal generated by the P2 processor and determines whether the cycle begun by the P2 processor is an MR cycle or an NMR cycle before asserting the ADS_P2_MOD* signal to the system bus 22. The ADS_P2* signal serves as a warning to the HOLD logic 38 that the P2 processor control logic 35 will assert the ADS_P2_MOD* signal on the next CLKA signal cycle.

The P2 processor control logic 35 also traps the system bus RDY* signal and generates a ready signal referred to as READY_P2* back to the P2 processor. The P2 processor control logic 35 traps the RDY* signal as a means of preventing the P2 processor from beginning a new bus cycle when the P1 processor is executing instructions, as is described below. Additionally, on I/O data reads the P2 processor receives its data from the transceiver/register 112 at least several CLKA signal cycles after the system C has supplied the data. In this instance, the system RDY* signal is not asserted to enable the P2 processor to receive this data because the system bus 22 is not directly providing the data. Therefore, the control logic 35 asserts the READY_P2* signal in this instance to enable the P2 processor to receive the data from the transceiver/register 112.

Figure 15:
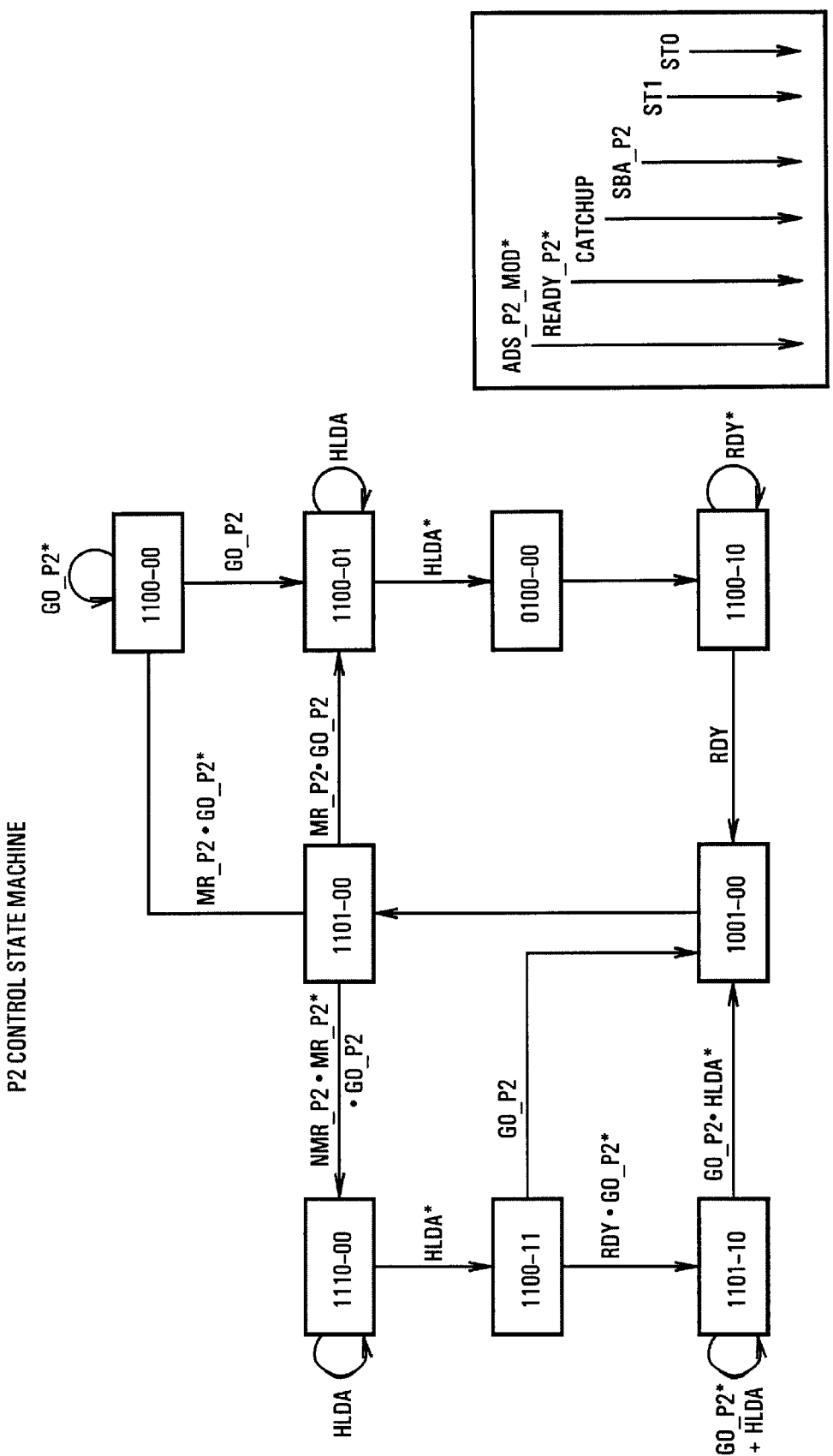

Referring now to FIG. 15, a state diagram illustrating the operation of the P2 processor control logic 35 implemented in the PAL's 130 and 132 according to the present invention is shown. Each state of the state machine comprises six values representing the status of the outputs of the PAL 132. The four leftmost values represent the status of the ADS_P2_MOD*, READY_P2*, CATCH_UP, and SBA_P2 signals, respectively. The two rightmost values represent the status of ST1 and ST0, respectively. The state machine changes state on the rising edge of the CLKA signal. State 1101-00 represents the initial or rest state of the state machine, and all states of the state machine lead to this state when the RESET signal is asserted.

The state machine progresses from state 1101-00 to state 1100-00 only during power up of the computer system C when the P1 processor is in control of the system bus 22 and the P2 processor asserts its ADS P2* signal for the first time. The condition for this progression is:

MR_P2·GO_P2*

The SBA_P2 signal is negated low in this state, principally to distinguish this state from the previous state, and the state machine remains in state 1100-00 while the GO_P2 signal is negated. During this time, the P1 processor is executing test and initialization instructions. When the P1 processor begins an NMR cycle, the P1 processor control logic state machine (FIG. 14) progresses from state 1011-0 to state 1111-0 and asserts the GO_P2 signal, which causes the P2 processor state machine to advance from state 1100-00 to state 1100-01. This progression occurs only on power up of the computer system C. Thereafter, the state machine progresses from its initial or rest state 1101-00 directly to either state 1110-00 or state 1100-01, depending on whether the cycle begun by the P2 is an NMR cycle or MR cycle, respectively. In general, when the state machine is in its initial state, the P2 processor control logic 35 is waiting for the P2 processor to assert its ADS_P2* signal, which will be trapped by the P2 processor control logic 35 and used to determine whether the state machine should advance to state 1110-00 or state 1100-01 for an NMR cycle or MR cycle, respectively. It should be noted that the state machine may only advance to state 1100-01 from state 1100-00 because the first cycle performed by the P1 and P2 processors after power on of the computer system C is guaranteed to be an MR cycle according to the preferred embodiment.

The state machine progresses from its rest state to state 1100-01 when the following condition is true:

MR_P2·GO_P2

The P2 processor control logic state machine advances from its rest state to state 1100-01 when the P2 processor has begun an MR cycle and has control of the system bus 22. In state 1100-01 the SBA_P2 signal is negated low to enable the transceiver/register 112. Also, the ADS_P2* signal is asserted low to the HOLD logic 38 in this state, informing the HOLD logic 38 that the P2 processor is about to begin a bus cycle and that the ADS_P2_MOD* signal will be asserted on the next CLKA signal cycle. The state machine remains in state 1100-01 if the HLDA signal is asserted, which signifies that the HOLD logic 38 has acknowledged a HOLD request. The state machine progresses from state 1100-01 to state 0100-00 when the HLDA* signal is negated. In state 0100-00, the ADS_P2_MOD* signal is asserted low, enabling a P2 processor bus cycle, and the state machine progresses to state 1100-10 on the next CLKA signal cycle. The state machine remains in this state while the P2 processor completes its cycle, signified by the RDY* signal being negated. In each of the above states the SBA_P2 signal is negated, thereby enabling the DCLK_P2 signal to behave as a clock, which enables the transceiver/register 112 to continuously latch data on successive clock cycles. This allows the P2 processor to receive its data from the transceiver/register 112 on its MR cycles.

The state machine progresses to state 1001-00 when the P2 processor bus cycle is completed, signified by the RDY* signal being asserted. In state 1001-00, the control logic 35 asserts the READY_P2* signal to the P2 processor, enabling the P2 processor to begin a new cycle. The SBA_P2 signal is asserted in this state, but this assertion only has meaning when the state machine arrives at this state from the NMR cycle path of the state machine, as is explained below. The state machine then returns to its initial state, state 1101-00, where the control logic 35 waits for the P2 processor to assert its ADS_P2* signal. When the P2 processor asserts its ADS_P2* signal, and the current cycle is not a coprocessor cycle, the state machine advances to either state 1100-01 or state 1110-00 depending on whether the cycle begun by the P2 processor is an MR cycle or an NMR cycle, respectively.

The P2 processor state machine advances from its initial state, state 1101-00, to state 1110-00 when the condition:

NMR_P2·MR_P2*·GO_P2 is true. The state machine advances from its initial state to state 1110-00 when the cycle begun by the P2 processor is an NMR cycle. When the P2 processor begins an NMR cycle, the ADS_P2_MOD* signal is not enabled onto the system bus 22. The P2 processor control logic 35 asserts the CATCH_UP signal in state 1110-00, informing the P1 processor control logic 34 that the P2 processor has caught up to the NMR cycle previously begun by the P1 processor which caused control of the system bus 22 to pass to the P2 processor. The P2 processor control logic 35 checks to see if a HOLD cycle is in progress after every NMR cycle begun by the P2 processor in state 1110-00, and the state machine remains in this state if the HLDA signal is asserted. The error detection logic 40 compares the address signals on the respective pins of the two processors in state 1110-00. If the NMR cycle is a write cycle, then the error detection logic 40 also compares the values present on the data pins of each of the P2 processor and P1 processors at this time.

The state machine progresses to state 1100-11 if the HLDA signal is negated, and the CATCH_UP signal is negated in this state. The address and data signals of the P2 processor are at a stable level after the HLDA signal is deasserted for the comparisons which occur in state 1110-00. The AMATCH signal is asserted in state 1110-00 if the address signal comparisons are true, and the result of these comparisons are monitored in state 1100-11.

If the AMATCH signal is negated, signifying that an address match did not occur, then the GO_P2 signal remains asserted. When the GO_P2 signal is asserted, the P2 processor control logic state machine advances from state 1100-11 to state 1001-00, and the READY_P2* signal is asserted to the P2 processor. The state machine then returns to it initial or rest state, state 1101-00, and the P2 processor begins another cycle. In this instance, the P2 processor will begin executing instructions ahead of the P1 processor, and the internal difference logic 36 will account for any of the known internal differences between the 80486 and 80386 processors discussed in the background and will attempt to maintain the two processors in synchrony. If the discrepancies that occur between the two processors cannot be accommodated by the internal difference logic 36, then this logic asserts the KILL_P2 signal to the P1 processor control logic 34, disabling the P2 processor and the error detection logic 40 until a hardware interrupt occurs.

If the AMATCH signal is asserted in state 1110-00, then the P1 processor control logic state machine (FIG. 14) advances from state 1111-0 to state 1010-0, and the GO_P2 signal is deasserted by the time the P2 processor state machine reaches state 1100-11. An address signal match returns control of the system bus 22 to the P1 processor, which then completes the pending NMR bus cycle which initially caused the P2 processor to gain control of the system bus 22. When the P1 processor has completed the NMR bus cycle, the system bus RDY* signal is asserted low. The P2 processor state machine (FIG. 15) progresses from state 1100-11 to state 1101-10 when the P1 processor completes the NMR cycle, signified by the condition:

RDY·GO_P2* being true.

Therefore, the state machine progresses to state 1101-10 when there has been an address signal match on the corresponding P2 processor NMR cycle. Prior to state 1101-10, the SBA_P2 signal has been negated low, enabling the DCLK_P2 signal to behave as a clock and thereby enabling the latching operation of the transceiver/register 112 on each rising edge of the DCLK_P2 signal. In state 1101-10, the SBA_P2 signal is asserted high, forcing the DCLK_P2 signal to a logic high value which disables the latching operation of the transceiver/register 112 and prevents it from latching any more data. The data that is stored in the transceiver/register 112 is the data that was on the system bus 22 when the RDY* signal was returned by the system C for the P1 processor NMR cycle. If the NMR cycle was an I/O data read cycle, then the data stored in the transceiver/register 112 is the data received by the P1 processor during its equivalent I/O data read cycle.

It should be noted that NMR cycles begun by the P2 processor are never propagated to the system bus 22. Address and data signals generated by the P2 processor during execution of write instructions are used only to compare against equivalent cycles begun by the P1 processor in state 1110-00. P2 processor I/O data read cycles are terminated with data received from the transceiver/register 112 and therefore need not propagate to the system bus 22, as is described further below.

The state machine remains in state 1101-10 while the GO_P2 signal is negated, and during this time the P1 processor is executing instructions ahead of the P2 processor. The P2 processor waits in this state until the P1 processor begins another NMR cycle, at which time the GO_P2 signal is asserted. When the GO_P2 signal is asserted, and the HLDA signal is negated, the state machine advances to state 1001-00. The READY_P2* signal is asserted to the P2 processor in state 1001-00, signifying that the pending NMR bus cycle is complete and enabling the P2 processor. If the previous NMR cycle was an I/O data read cycle, then the asserted READY_P2* signal indicates that valid data is present on the data pins of the P2 processor. The DFLOAT_P2 signal is negated in this state, and the P2 processor receives its data from the transceiver/register 112. This guarantees that the P2 processor receives the same data that the P1 processor receives for the corresponding I/O read cycle. If the NMR cycle previously begun by the P2 processor was a write cycle, then the data in the transceiver/ register 112 is ignored, and the state machine returns to it initial state, state 1101-00. The P2 processor asserts its ADS_P2* signal in this state to begin another cycle. If the new cycle is not a coprocessor cycle, then the state machine either branches left or right depending on whether the cycle begun by the P2 processor is an NMR cycle or MR cycle, respectively, and the progression described above is repeated.

It should be noted that the P2 processor control logic 35 activates the P2 processor by asserting the READY_P2* signal to the P2 processor, which terminates its previous NMR cycle. This is in contrast to the manner in which the P1 processor is activated from state 1111-0 (FIG. 14), which occurs by the P1 processor control logic 34 enabling the ADS_P1_MOD* signal to the system bus 22. The P2 processor is activated by the asserted READY_P2* signal because P2 processor NMR cycles are not propagated to the system bus 22. Therefore, the P2 processor does not need the ADS_P2_MOD* signal provided to the system bus 22 during NMR cycles and can be activated by the READY_P2* signal.

Figure 16:
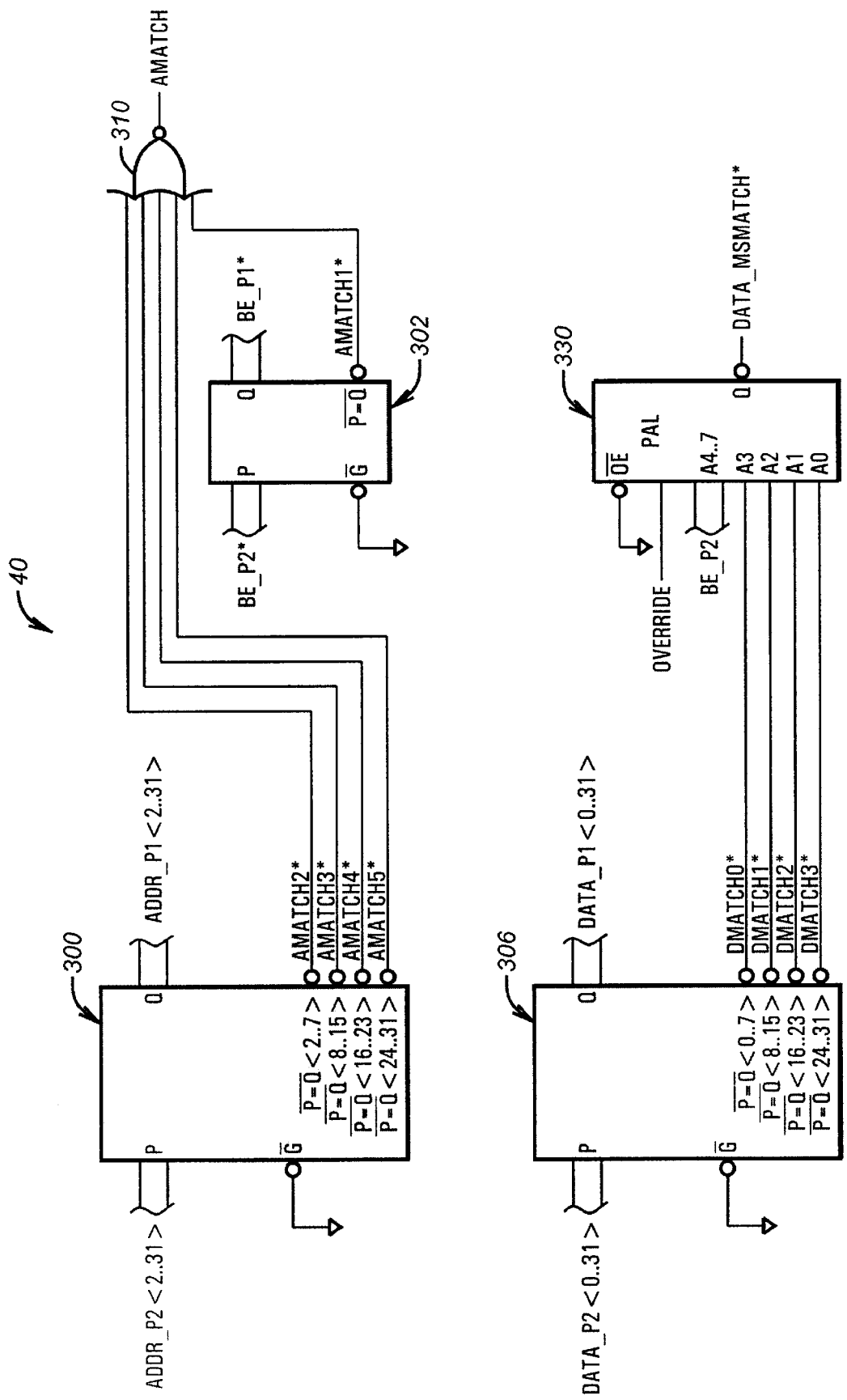

Referring now to FIG. 16, the error detection logic 40 on the FTD board 20 comprises comparators which determine if the address and data signals generated by the P2 processor and P1 processors match for corresponding NMR bus cycles. Each comparator compares the signals provided to its inputs and generates one or more signals indicative of whether a match has occurred. Each of the comparators includes a gating input, which, when asserted low, enables the operation of the comparator, and, when negated high, disables the comparator. The gating input of each of the comparators is tied to a logic low value according to the preferred embodiment.

The error detection logic 40 includes a 30-bit comparator 300 which compares the address signals generated by the P1 and P2 processors. The ADDR_P1<2 . . . 31> signals and the ADDR_P2<2 . . . 31> signals are connected to inputs of the comparator 300. The comparator 300 generates four output signals: the AMATCH2* signal, the AMATCH3* signal, the AMATCH4* signal, and the AMATCH5* signal. The AMATCH2* signal indicates, when asserted low, that the ADDR_P1<2 . . . 7> signals match the ADDR_P2<2 . . . 7> signals. The AMATCH3* signal indicates, when asserted low, that the ADDR_P1<8 . . . 15> signals match the ADDR_P2<8 . . . 15> signals. The AMATCH4* signal indicates, when asserted low, that the ADDR_P1<16 . . . 23> signals match the ADDR_P2<16 . . . 23> signals. The AMATCH5* signal indicates, when asserted low, that the ADDR_P1<24 . . . 31> signals match the ADDR_P2<24 . . . 31> signals.

The error detection logic 40 includes a comparator 302 which compares the byte enable signals generated by the P2 processor and P1 processor microprocessors and generates a signal indicative of whether these signals match. The BE_P2* and BE_P1* signals are connected to the inputs of the comparator 302. The comparator 302 generates a signal referred to as AMATCH1* which is asserted low when the BE_P2* signals match the BE_P1* signals. The AMATCH1*, AMATCH2*, AMATCH3*, AMATCH4*, and AMATCH5* signals are connected to the inputs of a five input NOR gate 310 whose output is a signal referred to as AMATCH.

The error detection logic 40 includes a comparator 306 which compares the data signals output from the P1 processor and P2 processors. The DATA_P1<0 . . . 31> signals and the DATA_P2<0 . . . 31> signals are connected to respective inputs of the comparator 306. The comparator 306 generates a signal referred to as DMATCH0*, which is asserted low when the DATA_P1<0 . . . 7> signals match the DATA_P2<0 . . . 7> signals. The comparator 306 generates a signal referred to as DMATCH1*, which is asserted low when the DATA_P1<8 . . . 15> signals match the DATA_P2<8 . . . 15> signals. The comparator 306 generates a signal referred to as DMATCH2*, which is asserted low when the DATA_P1<16 . . . 23> signals match the DATA_P2<16 . . . 23> signals. The comparator 306 generates a signal referred to as DMATCH3*, which is asserted low when the DATA_P1<24 . . . 31> signals match the DATA_P2<24 . . . 31> signals.

The DMATCH0* signal, the DMATCH1* signal, the DMATCH2* signal, the DMATCH3* signal, the OVERRIDE signal and the BE_P2* signals are connected to the inputs of a PAL 330. The inverted output enable input of the PAL 330 is connected to a logic low value. The output of the PAL 330 is a signal referred to as DATA_MSMATCH*. The equation for the DATA_MSMATCH* signal is:

$$\begin{aligned}\text{DATA\_MSMATCH} = &\text{DMATCH0}^* \cdot \text{BE}{<}0{>} \cdot \text{OVERRIDE}^* + \\ &\text{DMATCH1}^* \cdot \text{BE}{<}1{>} \cdot \text{OVERRIDE}^* + \\ &\text{DMATCH2}^* \cdot \text{BE}{<}2{>} \cdot \text{OVERRIDE}^* + \\ &\text{DMATCH3}^* \cdot \text{BE}{<}3{>} \cdot \text{OVERRIDE}^*\end{aligned}$$

The DATA_MSMATCH signal decodes the condition where there is a mismatch on any of the four data byte comparisons, the corresponding byte enable signal was active, and the OVERRIDE signal is negated.

The AMATCH signal, the DATA_MSMATCH* signal, and a signal referred to as ADDR_MSMATCH, which is generated by the internal difference logic 36, may be provided to external logic (not shown) to record any mismatches between the two processors for later analysis. These signals may alternatively be provided to external logic (not shown) to alert the computer system C of possible faulty data or faulty instruction execution, thus providing a measure of fault-tolerance in the computer system C.

Figure 17:
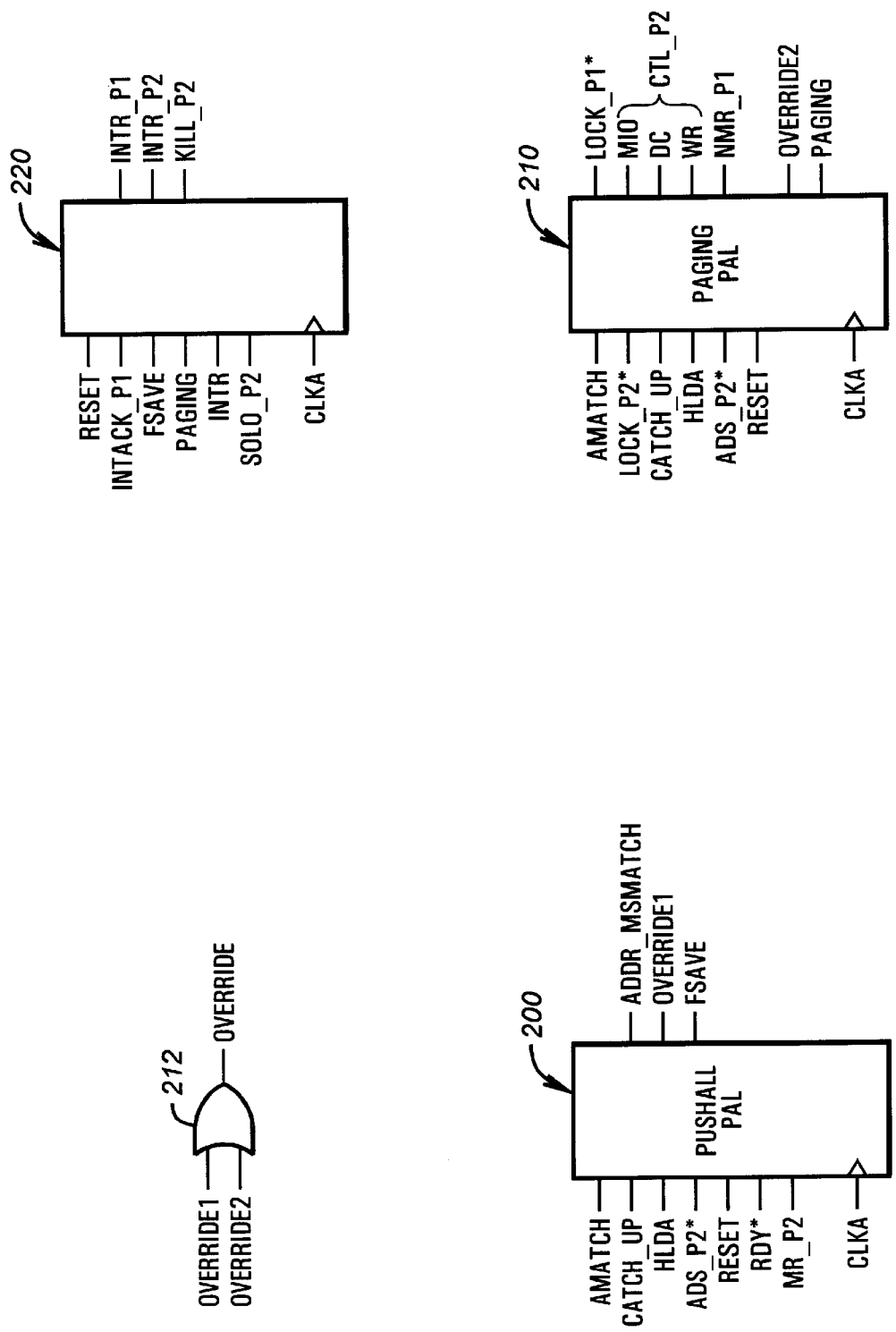

Referring now to FIG. 17, the internal difference logic 36 is generally shown. The internal difference logic 36 is specifically adapted to compensate for differences between the 80486 and 80386 processors, which are the P1 and P2 processors used in the preferred embodiment. Note that, if identical P1 and P2 processors are used, the internal difference logic 36 is unnecessary. The internal difference logic 36 accounts for differences between the 80486 and 80386 microprocessors with regard to the PUSHA/PUSHAD command, selector updates, the FSAVE command, certain paging instructions, and interrupt acknowledge cycles, as was discussed in the background. The internal difference logic 36 includes a programmable array logic device referred to as the PUSHALL PAL 200. The PUSHALL PAL 200 receives as inputs the AMATCH signal, the CATCH_UP signal, the HLDA signal, the ADS_P2* signal, the RESET signal, the RDY* signal, and the MR_P2 signal. The CLKA signal is connected to the clock input of the PAL 200. The PUSHALL PAL 200 generates the ADDR_MSMATCH signal as well as output signals referred to as OVERRIDE1 and FSAVE. The asserted ADDR_MSMATCH signal indicates that an address signal mismatch has occurred between the 80486 and 80386 processors that is not a result of the known internal differences between the two processors. The OVERRIDE1 signal is asserted to prevent the P1 processor control logic 34 from transferring control of the system bus 22 to the P2 processor in those instances where the P1 processor is executing instructions to catch up to the P2 processor. The asserted FSAVE signal decodes the execution of the FSAVE command or other non-recoverable code sequences.

Figure 18:
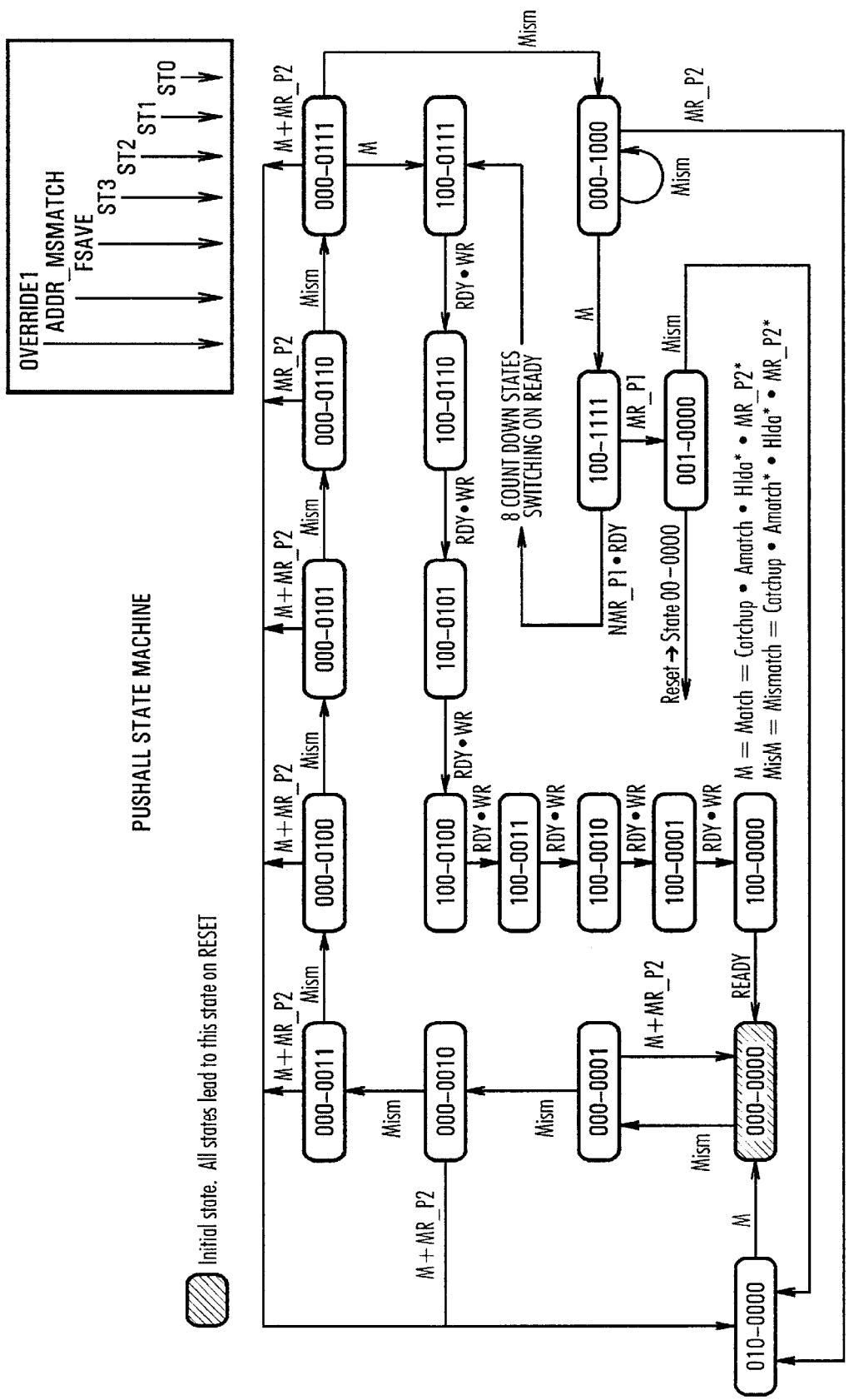

Referring now to FIG. 18, a state diagram which illustrates the operation of the PUSHALL PAL 200 according to the present invention is shown. For the purpose of clarity, the letter M decodes a match condition where the P2 processor has begun an NMR cycle and a match has occurred between the address signals generated by the P1 and P2 processors in their equivalent NMR cycle. A match is decoded when the following condition occurs:

M=MATCH=CATCH_UP·AMATCH·HLDA*·MR P2*

A mismatch is deemed to occur when the following condition occurs:

MISM=MISMATCH=CATCH_UP·AMATCH*·HLDA*·MR_P2*

The MISM condition decodes a mismatch between the address signals generated by the P1 and P2 processors on an equivalent NMR cycle. The PUSHALL PAL 200 is designed to tolerate either one, seven or fifteen consecutive address mismatches on NMR cycles, decoding either the extra write performed by the P2 processor on selector updates, the seven mismatching writes performed by the PUSHA command, or the fifteen mismatching writes performed by the PUSHAD command, respectively. If more than one and less than seven mismatches occur before either a match occurs or before the P2 processor performs an MR cycle, then the ADDR_MSMATCH signal is asserted.

The three leftmost values comprising the states in the state machine represent the status of the output signals OVERRIDE1, ADDR_MSMATCH, and FSAVE, respectively, which are produced by the PUSHALL PAL 200. The remaining four values are counting values generated inside the PAL 200, referred to as ST3, ST2, ST1, and ST0, which are used to count the number of consecutive mismatches which occur between the two processors. The state machine begins in an initial or rest state, state 000-0000, which is shown shaded for clarity, and all states lead to this state when the RESET signal is asserted.

The state machine advances from state 000-0000 to state 000-0001 when the MISM condition is true. In this instance, the P2 processor control logic state machine (FIG. 15) has progressed from state 1100-11 to state 1001-00, retaining control of the system bus 22. If a match occurs in state 000-0001, signified by M being true, or if the P2 processor performs an MR cycle, then the state machine returns to its initial state 000-0000. An oscillation between these two states decodes the condition where the 80386 processor performs an extra write cycle to the descriptor table entry after it reads the 8-byte descriptor. In this instance, the 80386 processor performs one extra write cycle than does the 80486 processor, and a progression to state 000-0001 and an immediate return to the rest state accounts for this extra memory write. Otherwise, this extra write, which is classified as a mismatch, would disrupt the P1 processor and P2 processor control logic 34 and 35, forcing the processors out of synchrony.

The state machine advances from state 000-0001 to state 000-0010 when another consecutive address mismatch resulting from an 80386 processor NMR cycle occurs. Thereafter, the state machine progresses through five more states on consecutive address mismatches, counting a total of seven consecutive mismatches from state 000-0000 to state 000-0111. This occurrence is one of two instances where the P2 processor is allowed to execute instructions ahead of the P1 processor, the other occurrence being during certain paging operations, as is described further below. During these state transitions, the last four bits of each of the states in the state machine progressively count upward from 0000 to 0111, and the state machine advances from state 000-0000 to state 000-0111. If a match occurs in any of these states, or if the P2 processor performs an MR cycle, then the state machine goes to state 010-0000 and the ADDR_MSMATCH signal is asserted. The state machine then returns from state 010-0000 to its initial state.

If the state machine advances to state 000-0111, then seven consecutive address mismatches have occurred on P2 processor NMR cycles. If M is true on the next NMR cycle, then the state machine advances to state 100-0111, and the PUSHALL PAL has decoded the condition where the PUSHA command has been performed by the P2 processor. If M is true in state 000-0111, the P1 processor state machine (FIG. 14) advances from state 1111-0 to state 1010-0, and the P1 processor gains control of the system bus 22. The OVERRIDE1 signal is asserted in state 100-0111, which asserts the OVERRIDE signal to the P1 processor control logic 34.

The state machine counts backward from state 100-0111 to state 100-0000. In this progression, the state machine is counting backward seven states to allow the 80486 processor to perform the PUSHA instruction that was previously performed by the 80386 processor during the state transitions from state 000-0000 to state 000-0111. The condition for each of these seven state transitions is the completion of a write cycle, signified by the RDY* signal and the WR signal being asserted. The completion of a write cycle is included in the condition because, in some instances, the 80486 processor may perform prefetches during these countdown states, and these prefetches should not be classified as NMR cycles that are performed to execute the PUSHA instruction. In each of these transitions the OVERRIDE1 signal is asserted, which asserts the OVERRIDE signal to the P1 processor control logic 34. The asserted OVERRIDE signal prevents the P1 processor control logic 34 from transferring control of the system bus 22 to the P2 processor while the P1 processor is performing NMR cycles to execute the PUSHA instruction and is catching up to the P2 processor.

When the state machine is in state 000-0111 and another address mismatch occurs, then the state machine progresses to state 000-1000. In this instance, the state machine is decoding a PUSHALL DOUBLE command. The state machine progresses through seven more consecutive mismatches, progressing from state 000-1000 to state 000-1111. These seven mismatches are represented in FIG. 18 by the MISM condition maintaining the state machine in state 000-1000 during these seven transitions for clarity. Therefore, the state machine counts eight more consecutive mismatches from state 000-0111 to state 000-1111 to decode the PUSHALL DOUBLE command. If the P2 processor begins an MR cycle from any of these mismatches from state 000-0111 to state 000-1111, then the state machine progresses to state 010-0000, and the ADDR_MSMATCH signal is asserted. When the state machine is in state 000-1111 (represented in FIG. 18 as state 000-1000) and the M condition is true, then the state machine progresses to state 100-1111, the P1 processor gains control of the system bus 22, and the OVERRIDE1 signal is asserted.

If the P1 processor begins an NMR cycle on the next bus cycle in state 100-1111, signified by the condition:

NMR_P1·RDY then the PUSHALL state machine begins counting down and counts down fifteen states from state 100-1111 to state 100-0000 on respective NMR cycles, switching each time a write cycle is completed. During this countdown, the 80486 processor is executing fifteen NMR cycles in its performance of the PUSHAD instruction. The first eight counting down states account for the eight mismatches that occurred from state 000-1000 to state 000-1111, represented in FIG. 18 as state 000-1000. After counting down these eight states, the state machine has reached state 100-0111, where the state machine counts down the original seven mismatches which occurred between the initial state, state 000-0000 and state 000-0111. The PUSHALL PAL 200 asserts the OVERRIDE1 signal during this countdown, which asserts the OVERRIDE signal to the P1 processor control logic 34 to prevent the P1 processor control logic 34 from transferring control of the system bus 22 to the 80386 processor.

When the state machine is in state 100-1111 and the 80486 processor performs an MR cycle instead of an NMR cycle, then the state machine progresses to state 001-0000. In this instance, the PUSHALL PAL 200 has decoded execution of the FSAVE command, and the FSAVE signal is asserted. The asserted FSAVE signal asserts the KILL_P2 signal to the P1 processor control logic 34, disabling the P2 processor and the error detection logic 40 until a hardware interrupt occurs. The state machine the progress from state 001-0000 to state 010-0000, where the ADDR_MSMATCH signal is asserted.

Referring again to FIG. 17, the internal difference logic 36 includes a PAL device referred to as the PAGING PAL 210, which accounts for the internal differences between the 80486 processor and 80386 processors with regard to their paging operations. For example, the 80486 processor prefetches much more than the 80386 processor, and therefore the 80486 processor reaches a page boundary much quicker. If the respective page's Accessed bit is not set, then each of the processors must perform a read-modify-write cycle. These cycles are generally performed at different times due to the difference in prefetching patterns. In addition, a Call to an unaccessed page causes the processors to execute the memory cycles correct in functionality, but in different orders. Therefore, the PAGING PAL 210 is designed to tolerate up to eight consecutive mismatches during paging operations.

The PAGING PAL 210 receives as inputs the AMATCH signal, the LOCK_P2* signal, the CATCH_UP signal, the HLDA signal, the ADS_P2* signal, the RESET signal, the NMR_P1 signal, the CTL_P2 signals from the P2 processor, and the LOCK_P1* signal. The PAL 210 generates two signals referred to as OVERRIDE2 and PAGING. Additionally, there are four signals used for internal counting purposes as in the PUSHALL PAL 200. The PAGING signal decodes the condition where write execution differences occur on a Call instruction to an unaccessed page. When these write execution differences occur under these circumstances, the internal difference logic 36 is unable to maintain the two processors in synchrony. The asserted PAGING signal asserts the KILL_P2 signal to the P1 processor control logic 35, which disables the P2 processor and the error detection logic 40 until a hardware interrupt occurs. The PAGING PAL 210 utilizes the LOCK_P2* and LOCK_P1* signals to decode read-modify-write cycles which occur during paging operations because these cycles are LOCKed cycles.

Figure 19:
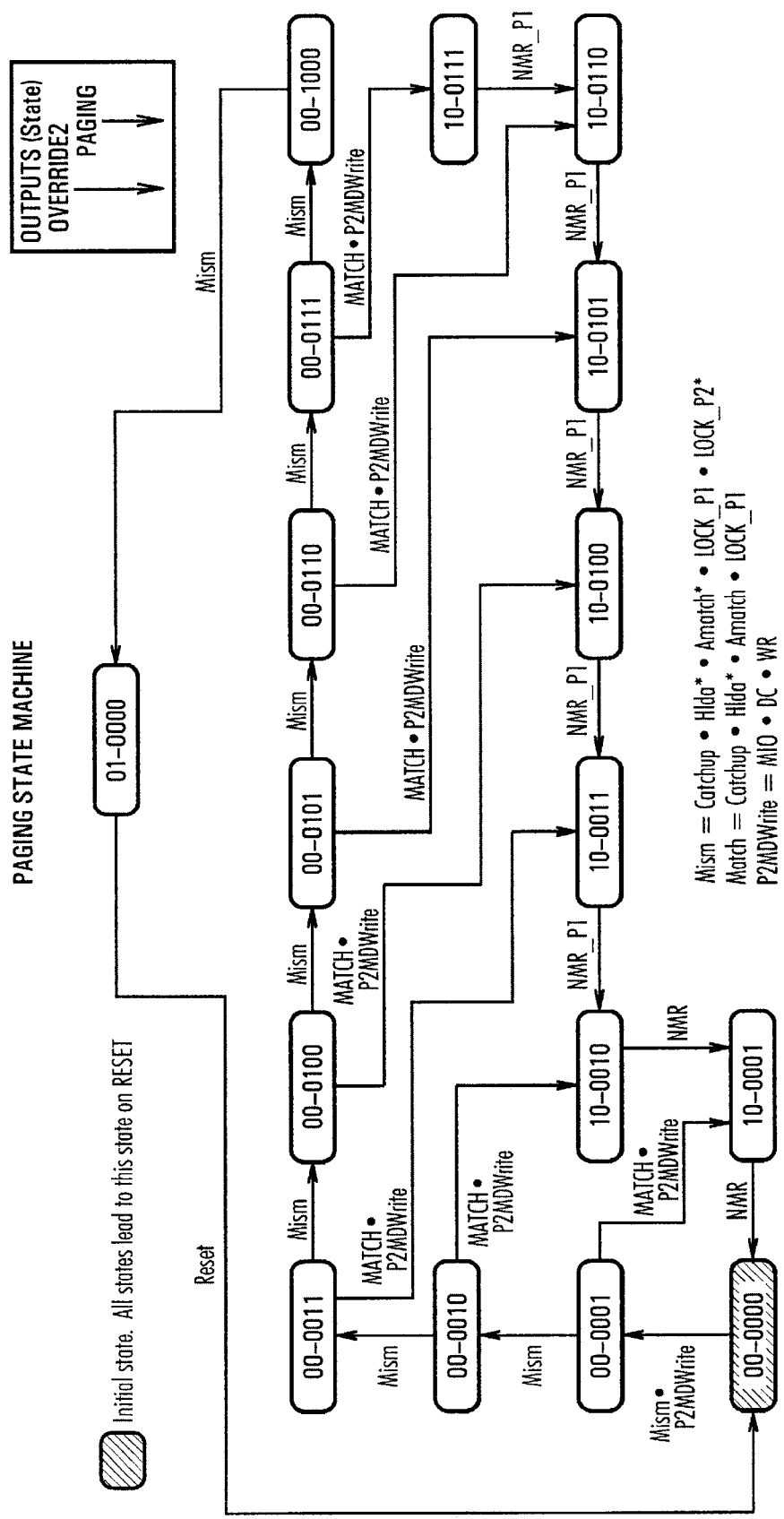

Referring now to FIG. 19, a state diagram illustrating the operation of the PAGING PAL 210 according to the present invention is shown. Each of the states in the state machine comprise six values. As shown in FIG. 19, the two leftmost values represent the two output signals OVERRIDE2 and PAGING, respectfully. The remaining four values in each of the states represent internal state signals generated by the PAGING PAL 210 which are used to count the number of consecutive address signal mismatches which occur between the two processors.

For the purpose of this state machine, the MISM condition decodes an address mismatch which occurs on certain paging operations. The equation for the MISM condition is as follows:

$$MISM = CATCH\_UP \cdot HLDA* \cdot AMATCH* \cdot LOCK\_P1 \cdot LOCK\_P2*$$

The MISM condition decodes the condition where the P1 and P2 processor address signals do not match, the P1 processor is in a LOCKed cycle, and the P2 processor is not performing a LOCKed cycle. As has already been noted, page table accesses involve read-modify-write cycles, and the 80486 processor asserts its LOCK* pin when it invokes a read-modify-write cycle. Therefore, the PAGING PAL 210 uses the LOCK_P1* and LOCK_P2* signals to decode certain paging operations of the two processors where certain inconsistencies could occur. A match is deemed to occur when the following condition occurs:

$$MATCH = CATCH\_UP \cdot HLDA \cdot AMATCH \cdot LOCK\_P1$$

The MATCH condition decodes the condition where the P2 processor is performing a read-modify-write cycle and an address signal match has occurred between the two processors. A P2 processor memory data write (P2MDWRITE) occurs when the following condition occurs:

$$P2MDWRITE = MIO \cdot WR \cdot DC$$

The state machine begins in an initial or rest state, state 00-0000, which is shown shaded for clarity, and all states lead to this state on the assertion of the RESET signal. The state machine progresses from state 00-0000 to state 00-0001 when the MISM condition is true and the P2 processor performs a memory data write cycle. In this instance, the P2 processor state machine (FIG. 15) has progressed from state 1100-11 to state 1001-00. The state machine continues counting upward while the MISM condition remains asserted or true, and during this time the P2 processor is in control of the system bus 22 performing NMR cycles that do not match the pending NMR cycle on the P1 processor. This is the second instance where the P2 processor is allowed to execute instructions ahead of the P1 processor. The state machine continues counting upward eight states to state 00-1000 on consecutive instances where the MISM condition is true, during which time there have been eight consecutive occurrences of the MISM condition.

If at any time during these eight intermediate states, the P2 processor performs a memory data write and the MATCH condition is true, signified by the condition:

MATCH·P2MDWRITE being true, then the P1 processor state machine (FIG. 14) progresses from state 1111-0 to state 1010-0 and control of the system bus 22 passes to the P1 processor. When this occurs, the PAGING PAL 210 asserts the OVERRIDE2 signal, and the state machine begins counting backward from the highest state that it had attained each time the P1 processor performs an NMR cycle. During these state transitions, the P1 processor is catching up to the P2 processor by performing the NMR cycles previously performed by the P2 processor when the PAGING state machine was advancing on the MISM condition. The OVERRIDE2 signal is asserted on each of these transactions, asserting the OVERRIDE signal to prevent the P1 processor control logic 34 from returning control of the system bus 22 to the P2 processor during each of these NMR cycles. The P1 processor performs the same number of NMR cycles performed by the P2 processor, after which the PAGING state machine is in its initial state, state 00-0000.

If the state machine reaches state 00-1000 and the MISM condition is true, then the state machine progresses to state 01-0000, and the PAGING signal is asserted. The asserted PAGING signal decodes the condition where write execution differences occur on a Call instruction to an unaccessed page, and this asserts the KILL_P2 signal to the P1 processor control logic 34. The KILL_P2 signal is asserted because a hardware reset is needed to resynchronize the two processors. The PAGING signal remains asserted until the RESET signal is asserted, at which time the state machine returns from state 01-0000 to its initial state, state 00-0000.

Referring again to FIG. 17, the OVERRIDE1 signal and the OVERRIDE2 signal are connected to the inputs of a two input OR gate 212 whose output is the OVERRIDE signal. Therefore, assertion of either the OVERRIDE1 signal or the OVERRIDE2 signal asserts the OVERRIDE signal to the P1 processor control logic 34.

The FTD board 20 includes a PAL 220 which generates the KILL_P2 signal to the P1 processor control logic 34. The PAL 220 receives as inputs the RESET signal, the INTACK_P1 signal, the PAGING signal, the FSAVE signal, the INTR signal, and the SOLO_P2 signal. The CLKA signal is connected to the clock input of the PAL 220. The equation for the KILL_P2 signal is:

KILL_P2=INTACK_P1+PAGING+FSAVE;

The PAL 220 asserts the KILL_P2 signal when any of the INTACK_P1, PAGING or FSAVE signals is asserted. The PAGING and FSAVE signals each decode a condition where a mismatch has occurred between the 80486 and 80386 processors that cannot be compensated for by the internal difference logic 36, thereby disrupting the operation of the control logic 34 and 35 and the error detection logic 40. The asserted INTACK_P1 signal asserts the KILL_P2 signal for reasons explained below. It should be noted that, when the KILL_P2 signal is asserted, no fault tolerant detection occurs between the P1 and P2 processors until a hardware interrupt occurs. The PAL 220 also traps the INTR signal and generates the INTR_P1 signal and the INTR_P2 signal. The equations for the INTR_P1 and INTR_P2 signals are:

INTR_P1:=INTR

INTR_P2:=INTR·SOLO_P2

The P1 processor always receives interrupts, and the P2 processor receives interrupts only if the P1 processor is disabled.

The present invention includes a method which allows the two processors to compare their real time operation when processing interrupts. As previously discussed, interrupts are difficult to process in the present invention because, even when dealing with identical processors, there is no way to assure that the value of the stack pointer for both processors will be the same at the time that they acknowledge an interrupt. Interrupts are asynchronous events and it is difficult to issue an interrupt to different processors at the same locations in their respective code. It is also very difficult to guarantee that individual processors will acknowledge the interrupt in the same location. Therefore, there is no assurance that the two processors will execute the exact same number of instructions (and therefore the exact same number of writes) in the period between the time when the interrupt request is received and the time it is acknowledged.

The method used to handle interrupt processing according to the present invention comprises reinitializing the processors after every interrupt to make sure that they are back in synchrony before they enter the interrupt handler. Interrupts are only presented to the P1 processor, and the P1 processor does not yield any more after an interrupt has been requested. The interrupt request generates the INTACK_P1 signal, which asserts the KILL_P2 signal to the P1 processor control logic, disabling the P2 processor and the error detection logic 40. The operating system in the computer system C according to the present invention includes a TSR (Terminate and Stay Resident) program which ensures that all hardware interrupts make the P1 processor execute a common piece of code, the purpose of which is to resynchronize the processors to a common state before the interrupt service routine is actually invoked. The TSR program is located in RAM 24 and traps all interrupt requests. When an interrupt request occurs, the TSR makes the P1 processor execute resynchronizing code, which saves the current state of the P1 processor and any associated processor extensions and then performs an extremely soft boot. The soft boot reinitializes the state of the two processors without flushing the contents of memory that usually accompanies a system reset. The soft boot also re-enables the P2 processor and the error detection logic. The reset vector is changed so that, after the reset, control returns to the resynchronizing code that just saved the processor state.

After the reboot, the two processors resume operation as described above where the P2 processor executes instructions after the P1 processor. The two processors eventually reach code in the resynchronizing code that restores the state of the P1 processor. The P1 processor and P2 processors each execute this code, thus placing each of the processors in the same state. This guarantees that the P2 processor has the same state as the P1 processor does upon entrance to the interrupt service routine. The P1 processor and P2 processors then execute the instructions comprising the interrupt, comparing their write operations in real time as previously described.

In order to clarify the operation of the processor control logic of the present invention, assume a program having the following sequence of instructions or bus cycles:

| Cycle Type | Data | |
|---|---|---|
| Fetch | CF1 | |
| Fetch | CF2 | |
| Fetch | CF3 | |
| Write | W1 | |
| Read | R1 | |
| Read | R2 | |
| Read Sync | R3 | ; Read sync (I/O read). |
| Read | R4 | |

When running on the computer system C with the FTD board 20 installed according to the present invention, the system bus 22 sees the following instruction stream:

| Cycle Type | Data | Processor |
|---|---|---|
| Fetch | CF1 | ; P1 |
| Fetch | CF2 | ; P1 |
| Fetch | CF3 | ; P1 |

-continued

| Cycle Type | Data | Processor |
|---|---|---|
| Fetch | CF1 | ; P2. P1 started Write, but yielded first. |
| Fetch | CF2 | ; P2 |
| Fetch | CF3 | ; P2 |
| Write | W1 | ; P1. P2's write used to compare and discarded. |
| Read | R1 | ; P1 |
| Read | R2 | ; P1 |
| Read | R1 | ; P2. P1 started Read Sync (I/O data read) but yielded first. |
| Read | R2 | ; P2 |
| Read Sync | R3 | ; P1. Data returned for this read will be latched. |
| Read | R4 | ; P1 |
| Read | R4 | ; P2. P2 processor's read of R3 was not propagated to the system bus, since the data for it was available from the transceiver/register |

By executing in the above described manner, discrepancies between the processors can be immediately flagged. The rule for manipulating I/O read cycles assures that both processors receive exactly the same input without overly restricting their read operations. In the particular case of the 80486 processor and the 80386 processor, there is a substantial difference in the way code is fetched, and the way memory is read if the internal cache of the 80486 processor is enabled. By avoiding checks on all read cycles, the FTD board 20 is allowed to continue even if the read streams show little resemblance. Discrepancies are flagged when write cycles occur on the P2 processor. At that time, the same write cycle is pending on the P1 processor, and address and data is available for comparison. The FTD board 20 flags a mismatch on either addresses or data so that instruments attached to it (not shown) can record the event for later analysis. Alternatively, external logic can be provided which generates a hardware interrupt on every occurrence of a mismatch in order to overcome the error and resynchronize the processors.

Therefore, the present invention includes a board comprising two non-identical code compatible processors and logic that controls the operation of these two processors, compares their write operations in real time, and generates signals indicative of any discrepancies.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

What is claimed is:

1. An apparatus for detecting inconsistencies in microprocessors in a computer system having a system bus and memory coupled to the system bus, wherein the memory includes program instructions, the apparatus comprising:

a first microprocessor coupled to the system bus for executing the instructions in the memory when said first processor has control of the system bus;

a second microprocessor coupled to the system bus for executing the instructions in the memory performed by said first processor when said second processor has control of the system bus;

processor control logic coupled to said first processor and said second processor, said processor control logic arbitrating control of the system bus between said first processor and said second processor;

wherein said processor control logic removes said first processor from control of the system bus when said first processor begins a write cycle and grants control of the system bus to said second processor;

wherein said processor control logic returns control of the system bus from said second processor to said first processor when said second processor begins said write cycle, said first processor resuming execution of the instructions in the memory; and error detection logic coupled to said first and second processors which compares address and data information generated by each of said processors on said write cycle when said processor control logic returns control of the system bus to said first processor, said logic generating a signal indicative of a match between said address and data signals of said first and second processors.

2. The apparatus of claim 1, wherein said first and second processors include means for asserting first and second address strobe signals, respectively, when said processors begin a bus cycle, said first and second address strobe signals being coupled to said processor control logic, wherein said processor control logic further includes:

means for determining whether said bus cycle is a memory read cycle;

means for asserting third and fourth address strobe signals, respectively, to the system bus when said first and second processors begin a memory read cycle; and means for asserting said third address strobe signal when said second processor begins a cycle other than a memory read.

3. The apparatus of claim 2, wherein said first and second microprocessors in the computer system generate HOLD requests to request control of the system bus, the apparatus further comprising:

means coupled to the system bus and to said processor control logic for receiving HOLD requests from said first and second microprocessors; and means for asserting a hold acknowledge signal to said first and second microprocessors upon receiving said HOLD request.

4. The apparatus of claim 3, wherein said hold acknowledge signal asserting means provides said hold acknowledge signal to said processor control logic; and wherein said processor control logic delays assertion of said third and fourth address strobe signals while said hold acknowledge signal is asserted.

5. The apparatus of claim 4, wherein said first and second address strobe signals are provided to said HOLD request receiving means;

wherein said HOLD request receiving means delays assertion of said hold acknowledge signal when either of said address strobe signals is asserted.

6. The apparatus of claim 2, wherein each of said microprocessors in the computer system asserts a ready signal when it completes a processor bus cycle, wherein the processor control logic further includes:

means for receiving the ready signal;

means coupled to said computer system ready signal receiving means for generating third and fourth ready signals that are provided to said first and second processors, respectively;

said processor control logic including means for asserting said third ready signal after the computer system finishes a first processor bus cycle;

said processor control logic including means for asserting said fourth ready signal after the computer system finishes a second processor memory read cycle; and said processor control logic including means for asserting said fourth ready signal after said first processor begins a cycle other than a memory read cycle and relinquishes control of the system bus.

7. The apparatus of claim 6, wherein write cycles executed by said second processor do not propagate to the system bus.

8. The apparatus of claim 1, wherein the system bus comprises a plurality of signals and said first and second processors each interface to the plurality of signals when said respective processor has control of the system bus, the apparatus further comprising:

multiplexing means coupled to said processor control logic and said first and second processors which selectively enables either said first or second processor to interface with the plurality of system bus signals at the direction of said processor control logic.

9. The apparatus of claim 8, wherein the computer system includes an input/output device coupled to the system bus and the first and second processors perform read cycles to the input/output device, wherein said first and second processors each include data pins which generate and receive data signals, wherein said processor control logic further includes:

means for removing said first processor from control of the system bus when said first processor begins an input/output data read cycle;

means for granting said second processor control of the system bus when said first processor begins said input/output data read cycle, wherein said second processor executes instructions previously performed by said first processor;

means for returning control of the system bus to said first processor when said second processor begins said input/output data read cycle;

a latching means with inputs coupled to the data pins of said first processor and outputs coupled to the data pins of said second processor, said latching means comprising:

means for latching data provided to said first processor when said first processor performs said input/output data read instruction; and means for providing said latched data to said second processor when said second processor performs said input/output read instruction.

10. The apparatus of claim 1, wherein the computer system can generate interrupt requests to assume temporary control of the system from a current program state of the system, the apparatus further comprising:

means for providing said interrupt requests only to said first processor;

means for disabling said second processor and said error detection logic when said first processor receives said interrupt request;

means for forcing said first processor to resynchronize said first and second processors, said resynchronizing means including:

means for saving the current program state of said first processor as a saved state when first processor receives said interrupt request;

means for reinitializing said first and second processors, said reinitializing means enabling said second processor and said error detection logic; and means for placing said first and second processors in said saved state; and said first and second processors performing interrupt responsive operations.

11. The apparatus of claim 1, wherein said error detection logic comprises comparators which compare said address and data information generated by said first and second processors.

12. The apparatus of claim 1, wherein said first and second processors are non-identical, object code compatible processors.

13. The apparatus of claim 1, wherein said first and second processors have internal differences in the execution of certain instructions and operations, the apparatus further comprising:

internal difference logic for resynchronizing said error detection logic and said first and second microprocessors when said internal difference instructions and operations occur;

wherein said internal difference logic includes means for disabling said error detection logic during said instructions and operations.

14. The apparatus of claim 1, wherein said first processor includes an internal cache which is enabled.

15. The apparatus of claim 1, further comprising:

means coupled to said processor control logic for disabling said first processor;

wherein said processor control logic allows only said second processor access to the system bus to execute the instructions in the memory when said first processor is disabled; and means coupled to said processor control logic for disabling said second processor;

wherein said processor control logic allows only said first processor access to the system bus to execute the instructions in the memory when said second processor is disabled.

16. A method for detecting inconsistencies in microprocessors in a computer system having a system bus, memory coupled to the system bus, wherein the memory includes program instructions, a microprocessor board having a first microprocessor coupled to the system bus for control thereof and executing the instructions in the memory when said first microprocessor has control of the system bus, a second microprocessor coupled to the system bus for control thereof and executing instructions in the memory when said second microprocessor has control of the system bus, processor control logic coupled to the first and second processors, said processor control logic arbitrating control of the system bus between the first and second processors, and error detection logic which compares write operations performed by the first and second microprocessors, the method comprising:

the first microprocessor executing instructions from the memory;

the processor control logic granting control of the system bus to the second processor when the first processor begins a write cycle, wherein said granting takes place before the write cycle is propagated to the system bus;

the second processor executing the instructions previously performed by the first microprocessor;

the processor control logic granting control of the system bus from the second processor to the first processor when the second processor begins said write cycle;

the error detection logic comparing address and data signals generated by the first and second microprocessors during said write cycle to determine inconsistent operation between the processors; and the first processor resuming execution of the instructions from the memory.

17. The method of claim 16, further comprising:

the first and second processors asserting first and second address strobe signals, respectively, when they begin a bus cycle, said first and second address strobe signals being coupled to said processor control logic;

the processor control logic determining whether said bus cycle is a memory read cycle or a non-memory read cycle;

the processor control logic asserting third and fourth address strobe signals to the system bus when the first and second processors begin a memory read cycle; and the processor control logic asserting said third address strobe signal when the second processor begins a cycle other than a memory read.

18. The method of claim 17, wherein the first and second microprocessors in the computer system generate HOLD requests to the microprocessor board to request control of the system bus, wherein the microprocessor board further includes a HOLD means coupled to the system bus which receives HOLD requests from the microprocessors in the computer system, the method further comprising:

the HOLD means asserting a hold acknowledge signal to the computer system and the processor control logic when the HOLD means receives a HOLD request;

the processor control logic not asserting said third and fourth address strobe signals while said hold acknowledge signal is asserted.

19. The method of claim 18, further comprising:

the first and second processor providing said first and second address strobe signals to said HOLD means; and said HOLD means not asserting said hold acknowledge signal if either of said address strobe signals is asserted.

20. The method of claim 17, wherein each of the first and second microprocessors in the computer system asserts a ready signal when it completes a processor bus cycle, the method further comprising:

the processor control logic receiving the computer system ready signal and generating third and fourth ready signals that are provided to said first and second processors, respectively;

the processor control logic asserting said third ready signal when the first processor finishes a first processor bus cycle; and the processor control logic asserting said fourth ready signal when the first processor begins a cycle other than a memory read and relinquishes control of the system bus.

21. The method of claim 16, wherein the computer system can generate interrupt requests and further includes a resynchronizing means, the method further comprising:

interrupt requests being provided only to the first processor;

said interrupt request disabling the second processor and the error detection logic;

the resynchronizing means saving the state of the first processor;

the resynchronizing means reinitializing the state of the first and second processors, said reinitializing enabling the second processor and the error detection logic;

the resynchronizing means placing the first and second processors in said saved state; and the first and second processors executing the interrupt routine.

22. The method of claim 16, wherein the computer system further includes input/output memory locations which can return different data when read at different times, and latching means for storing data provided to the first processor when said first processor reads one of said input/output memory locations, the method further comprising:

the processor control logic granting control of the system bus to the second processor when the first processor begins a read cycle to one of said input/output address locations;

the second processor executing instructions previously performed by the first microprocessor;

the processor control logic returning control of the system bus to the first processor when the second processor begins a read cycle to said input/output memory location;

the first processor executing said I/O read cycle;

the latching means latching data that the first processor receives during execution of said I/O read cycle;

the processor control logic granting control of the system bus to the second processor when the first processor begins a cycle other than a memory read; and the second processor receiving said data stored in said latching means when the second processor regains control of the system bus and executes said I/O read cycle.

23. The method of claim 16, further comprising:

the first and second microprocessors being synchronized at power on of the computer system and beginning execution in the same known state and at the same address; and the processor control logic granting the first microprocessor control of the system bus first.

24. The method of claim 16, wherein the first and second processors are non-identical, object code compatible processors.

25. The method of claim 16, wherein the first processor includes an internal cache which is enabled.

26. The method of claim 16, wherein the first or second processors may be disabled, the method further comprising:

the processor control logic not granting control of the system bus to the processor that is disabled.

27. An apparatus for detecting inconsistencies in microprocessors in a computer system having a system bus and memory coupled to the system bus, wherein the memory includes program instructions, the apparatus comprising:

a first microprocessor coupled to the system bus for executing the instructions in the memory and for driving the system bus with signals generated by said first microprocessor when said first processor has control of the system bus;

a second microprocessor coupled to the system bus for executing the instructions in the memory normally performed by said first processor, and for driving the system bus with signals generated by said second microprocessor when said second processor has control of the system bus;

processor control logic coupled to said first processor and said second processor, said processor control logic arbitrating control of the system bus between said first processor and said second processor;

wherein said processor control logic removes said first processor from control of the system bus when said first processor begins a write cycle and grants control of the system bus to said second processor;

wherein said processor control logic returns control of the system bus from said second processor to said first processor when said second processor begins said write cycle, said first processor resuming execution of the instructions in the memory; and error detection logic coupled to said first and second processors which compares address and data information generated by each of said processors on said write cycle when said processor control logic returns control of the system bus to said first processor, said logic generating a signal indicative of a match between said address and data signals of said first and second processors.

28. A method for detecting inconsistencies in microprocessors in a computer system having a system bus, memory coupled to the system bus, wherein the memory includes program instructions, a microprocessor board having a first microprocessor coupled to the system bus for control thereof by executing the instructions from the memory and driving the system bus with signals generated by said first microprocessor when said first microprocessor has control of the system bus, a second microprocessor coupled to the system bus for control thereof by executing instructions from the memory and driving the system bus with signals generated by said second microprocessor when said second microprocessor has control of the system bus, processor control logic coupled to the first and second processors, said processor control logic arbitrating control of the system bus between the first and second processors, and error detection logic which compares write operations performed by the first and second microprocessors, the method comprising:

the first microprocessor executing instructions from the memory;

the processor control logic granting control of the system bus to the second processor when the first processor begins a write cycle, wherein said granting takes place before the write cycle is propagated to the system bus;

the second processor executing the instructions previously performed by the first microprocessor;

the processor control logic granting control of the system bus from the second processor to the first processor when the second processor begins said write cycle;

the error detection logic comparing address and data signals generated by the first and second microprocessors during said write cycle to determine inconsistent operation between the processors; and the first processor resuming execution of the instructions from the memory.

* * * * *